United States Patent
Saito

(10) Patent No.: US 10,298,686 B2
(45) Date of Patent: May 21, 2019

(54) INTERMEDIATE SERVER, COMMUNICATION APPARATUS AND COMPUTER PROGRAM

(71) Applicant: BROTHER KOGYO KABUSHIKI KAISHA, Nagoya-shi, Aichi-ken (JP)

(72) Inventor: Ken Saito, Tokoname (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 716 days.

(21) Appl. No.: 14/040,097

(22) Filed: Sep. 27, 2013

(65) Prior Publication Data
US 2014/0189038 A1 Jul. 3, 2014

(30) Foreign Application Priority Data
Dec. 28, 2012 (JP) ................. 2012-286589

(51) Int. Cl.
*G06F 16/11* (2019.01)
*G06F 16/13* (2019.01)
*H04L 29/08* (2006.01)

(52) U.S. Cl.
CPC .......... *H04L 67/1097* (2013.01); *G06F 16/11* (2019.01); *G06F 16/113* (2019.01); *G06F 16/13* (2019.01); *H04L 67/1095* (2013.01)

(58) Field of Classification Search
CPC .. H04L 67/1095; H04L 67/1097; G06F 16/11; G06F 16/113; G06F 16/13; G06F 17/3007; G06F 17/30073; G06F 17/30091
See application file for complete search history.

(56) References Cited

U.S. PATENT DOCUMENTS

| 7,194,757 | B1 * | 3/2007 | Fish .................. G06Q 10/10 348/E7.07 |
| 8,793,343 | B1 * | 7/2014 | Sorenson, III .... G06F 17/30203 709/219 |
| 9,049,324 | B2 * | 6/2015 | Matsunaga .......... H04N 1/0044 |
| 9,262,417 | B2 * | 2/2016 | Matsumoto ....... G06F 17/30011 |

(Continued)

FOREIGN PATENT DOCUMENTS

| JP | 2005-269250 A | 9/2005 |
| JP | 2006-120065 A | 5/2006 |

(Continued)

*Primary Examiner* — Aaron N Strange
(74) *Attorney, Agent, or Firm* — Merchant & Gould P.C.

(57) ABSTRACT

There is provided an intermediate server for uploading data from a communication apparatus to a data storage server. While a current target file group including a current document file and some of plural image files to be uploaded is stored in the data storage server, the intermediate server receives an upload command for instructing an upload of a first image file to the data storage server, the current document file including text data for respectively specifying the image files stored in the data storage server. When the upload command is received, the intermediate server uploads the first image file, thereby changing the current target file group into a changed target file group which includes: a changed document file; and the first image file, the changed document file being acquired by adding first text data for specifying the first image file to the current document file.

11 Claims, 10 Drawing Sheets

(56) References Cited

U.S. PATENT DOCUMENTS

| | | | |
|---|---|---|---|
| 2003/0059123 A1* | 3/2003 | Omori | G06T 5/00 |
| | | | 382/254 |
| 2005/0213147 A1* | 9/2005 | Minatogawa | G06F 17/3089 |
| | | | 358/1.15 |
| 2008/0288499 A1* | 11/2008 | Choi | G06F 17/30274 |
| 2009/0083304 A1* | 3/2009 | Dornbach | G06F 17/30893 |
| 2009/0327303 A1* | 12/2009 | Ootjers | H04L 67/1097 |
| 2010/0205279 A1* | 8/2010 | Takakura | H04L 67/16 |
| | | | 709/219 |
| 2012/0113464 A1 | 5/2012 | Inoue et al. | |
| 2012/0278381 A1* | 11/2012 | Ferlitsch | G06Q 10/109 |
| | | | 709/203 |
| 2013/0073691 A1* | 3/2013 | Quan | H04L 67/06 |
| | | | 709/219 |
| 2014/0129627 A1* | 5/2014 | Baldwin | H04L 67/306 |
| | | | 709/204 |
| 2014/0380420 A1* | 12/2014 | Wang | G06F 17/30268 |
| | | | 726/4 |

FOREIGN PATENT DOCUMENTS

| | | |
|---|---|---|
| JP | 2012-99011 A | 5/2012 |
| WO | WO2012005609 A1 * | 1/2012 |

\* cited by examiner (EXAMPLE)

(EXAMPLE: CASE A)

(EXAMPLE: CASE B)

(COMPARATIVE EXAMPLE)

INTERMEDIATE SERVER, COMMUNICATION APPARATUS AND COMPUTER PROGRAM

CROSS-REFERENCE TO RELATED APPLICATION

This application claims priority from Japanese Patent Application No. 2012-286589, filed on Dec. 28, 2012, the entire subject matter of which is incorporated herein by reference.

TECHNICAL FIELD

Aspects of the present invention relate to a technique for uploading an image file from a communication apparatus to a data storage server.

BACKGROUND

JP-A-2005-269250 discloses a technique for enabling an image processing apparatus to upload image data generated by an image scanner, to a server.

SUMMARY

An aspect of the present invention provides a technique for appropriately uploading a plurality of image files from a communication apparatus to a data storage server.

According to an illustrative embodiment of the present invention, there is provided an intermediate server configured to intermediate between a communication apparatus and a data storage server in an upload of an image file from the communication apparatus to the data storage server. The intermediate server includes one or more processors; and memory storing computer-readable instructions therein. The computer-readable instructions, when executed by the one or more processors, cause the intermediate server to perform: at a state where a current target file group including a current document file and one or more of a plurality of image files to be uploaded is stored in the data storage server, receiving from the communication apparatus an upload command for instructing an upload of a first image file of the plurality of image files to the data storage server, the current document file including one or more text data for respectively specifying the one or more image files stored in the data storage server, the upload command including group identification information for identifying the target file group and the first image file; and when the upload command is received, uploading the first image file to the data storage server by using the group identification information, thereby changing the current target file group in the data storage server into a changed target file group, the changed target file group including a changed document file, the one or more image files, and the first image file, the changed document file being acquired by adding first text data for specifying the first image file to the current document file.

According to the above configuration, when the upload command is received from the communication apparatus at a state where the current target file group is stored in the data storage server, the intermediate server uploads the first image file to the data storage server by using the group identification information. That is, the intermediate server can change the current target file group such that the first image file is newly included in the target file group identified by the group identification information. Thereby, the intermediate server can appropriately upload the plurality of image files into the same target file group.

According to another illustrative embodiment of the present invention, there is provided a communication apparatus configured to upload an image file to a data storage server via an intermediate server. The communication apparatus includes one or more processor; and memory storing computer-readable instructions therein. The computer-readable instructions, when executed by the one or more processors, cause the communication apparatus to perform: at a state where an initial target file group is stored in the data storage server, acquiring group identification information for identifying the initial target file group from the data storage server through the intermediate server, the initial target file group including an initial document file and not including any of a plurality of image files to be uploaded, the initial document file not including any of a plurality of text data for respectively specifying the plurality of image files; and at a state where a current target file group including a current document file and one or more image files of the plurality of image files is stored in the data storage server, transmitting to the intermediate server an upload command for instructing an upload of a first image file of the plurality of image files to the data storage server, the current document file being acquired by adding one or more text data for respectively specifying the one or more image files to the initial document file, the upload command including the group identification information and the first image file.

According to the above configuration, the communication apparatus acquires the group identification information from the data storage server through the intermediate server at a state where the initial target file group is stored in the data storage server. The communication apparatus transmits the upload command including the group identification information and first image file to the intermediate server at a state where the current target file group is stored in the data storage server. That is, the communication apparatus can appropriately transmit the upload command to the intermediate server so that the first image file is newly included in the target file group identified by the group identification information.

A control method, a computer program and a non-transitory computer-readable recording medium storing the computer program for implementing the respective devices (i.e., the intermediate server, the communication apparatus) are also novel and useful. Also, a system including the intermediate server and the communication apparatus is also novel and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

ILLUSTRATIVE EMBODIMENTS

Configuration of System

Figure 1:
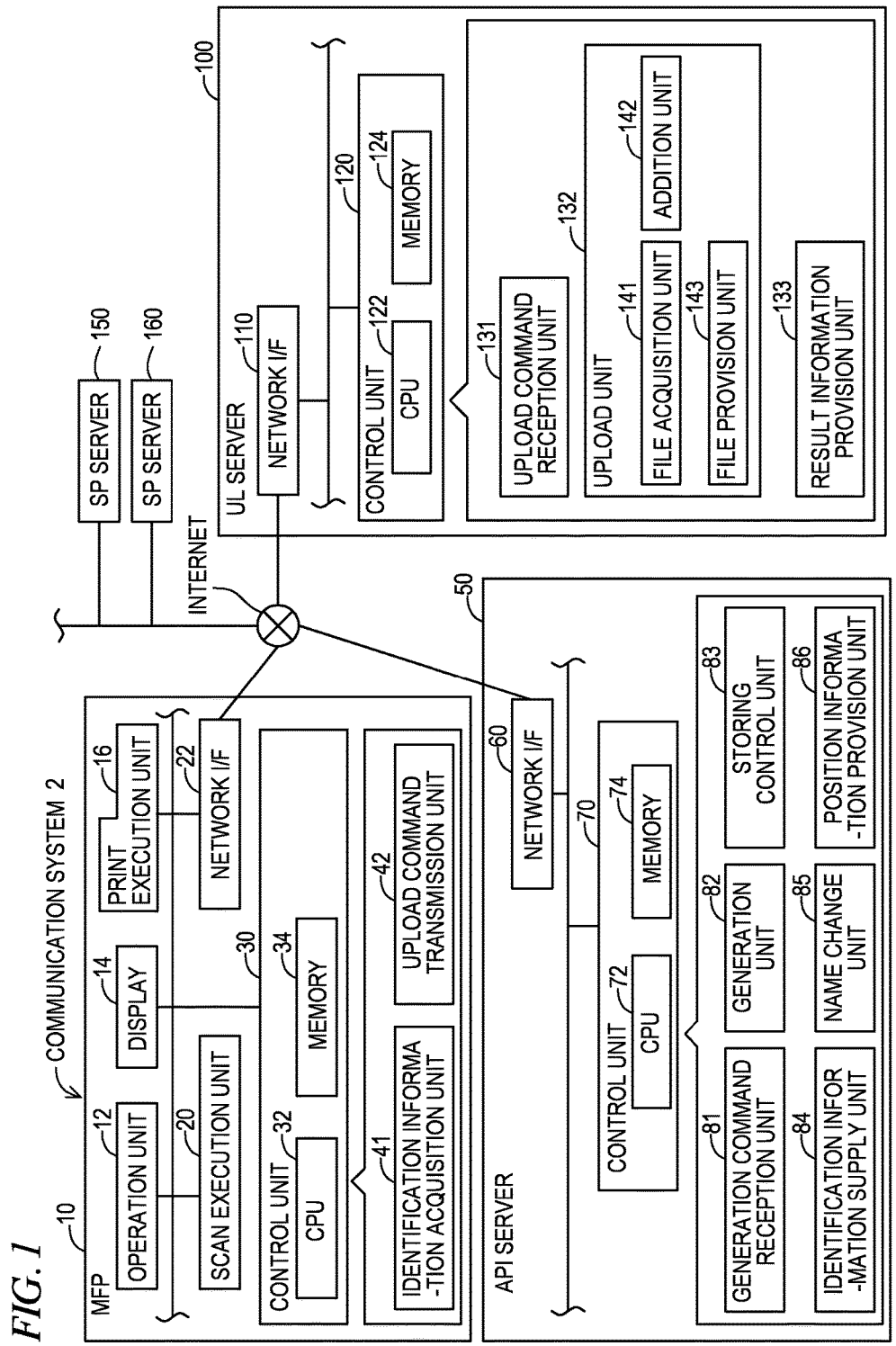
FIG. 1 shows a configuration of a communication system.

As shown in FIG. 1, a communication system 2 has an MFP (Multi-Function Peripheral) 10, an API (Application Program Interface) server 50, an upload server 100 (hereinafter, referred to as 'UL (UpLoad) server 100') and a plurality of service providing servers 150, 160 (hereinafter, referred to as 'SP (Service Providing) servers 150, 160'). The respective devices 10, 50, 100, 150, 160 can be connected to an Internet.

(Configuration of MFP 10)

The MFP 10 is a peripheral apparatus that can execute multi-functions such as printing, scan, copying, FAX functions and the like. The MFP 10 has an operation unit 12, a display 14, a print execution unit 16, a scan execution unit 20, a network I/F 22 and a control unit 30. The operation unit 12 has a plurality of keys. A user can input various instructions to the MFP 10 by operating the operation unit 12. The display 14 can display a variety of information. The print execution unit 16 has a printing mechanism such as an inkjet method, a laser method and the like. The scan execution unit 20 has a scan mechanism such as a CCD, a CIS and the like.

The network I/F 22 is an interface for connection to a LAN (Local Area Network). The network I/F 22 may be an interface that is connected to a wired LAN or an interface that is connected to a wireless LAN. The MFP 10 can be connected to the Internet through the network I/F 22 (i.e., through the LAN).

The control unit 30 has a CPU 32 and a memory 34. The CPU 32 executes a variety of processing according to programs stored in the memory 34. The CPU 32 executes the processing according to the programs, so that functions of respective units 41, 42 are implemented.

(Configuration of API Server 50)

The API server 50 is a server that is provided by a vendor of the MFP 10 and is an intermediate server of a service from the respective SP servers 150, 160 to the MFP 10. Specifically, the API server 50 communicates with the respective SP servers 150, 160 to thus execute data processing in accordance with respective APIs corresponding to the respective SP servers 150, 160.

The API server 50 has a network I/F 60 and a control unit 70. The API server 50 can be connected to the Internet through the network I/F 60. The control unit 70 has a CPU 72 and a memory 74. The CPU 72 executes a variety of processing according to programs stored in the memory 74.

The programs in the memory 74 include an application program for implementing the API server 50. The application program includes a program for executing respective processing shown in FIG. 4. The programs in the memory 74 further include a plurality of APIs corresponding to the SP servers 150, 160. Each of the APIs is a program for communicating with the SP server (for example, the SP server 150) corresponding to the API to thus execute data processing. In particular, the API corresponding to the SP server 150 includes a program for executing respective processing shown in FIG. 4. The CPU 72 executes the processing according to the application program and the API corresponding to the SP server 150, so that functions of respective units 81 to 86 are implemented.

(Configuration of UL Server 100)

The UL server 100 is a server that is provided by a vendor of the MFP 10 and is an intermediate server for a service from the respective SP servers 150, 160 to the MFP 10. Specifically, the UL server 100 uploads an image file to the respective SP servers 150, 160 in response to a request from the MFP 10.

The UL server 100 has a network I/F 110 and a control unit 120. The UL server 100 can be connected to the Internet through the network I/F 110. The control unit 120 has a CPU 122 and a memory 124. The CPU 122 executes a variety of processing according to programs stored in the memory 124.

The programs in the memory 124 include an application program for implementing the UL server 100. The application program includes a program for executing respective processing shown in FIG. 5. As can be clearly seen from a difference between the processing of FIG. 4 and the processing of FIG. 5, the application program for the UL server 100 is different from the application program for the API server 50. That is, the API server 50 and the UL server 100 are different servers that are implemented by the different application programs. The programs in the memory 124 further include a plurality of APIs corresponding to the SP servers 150, 160. In particular, the API corresponding to the SP server 150 includes a program for executing respective processing shown in FIG. 5. The CPU 122 executes the processing according to the application program and the API corresponding to the SP server 150, so that functions of respective units 131 to 133 are implemented. In the meantime, an upload unit 132 has respective units 141 to 143.

(Configuration of SP Servers 150, 160)

The respective SP servers 150, 160 are known service providing servers (i.e., cloud servers) such as 'Evernote (registered trademark)', 'Google (registered trademark) Docs', 'PICASA (registered trademark)', 'Facebook (registered trademark)' and the like. The respective SP servers 150, 160 can execute a data storage service of acquiring and storing data from a communication device (for example, the MFP 10). Also, the respective SP servers 150, 160 can execute a data providing service of providing data to the communication device.

The SP server 150 is a server that is provided by a first service provider (i.e., a first company) and the SP server 160 is a server that is provided by a second service provider (i.e., a second company) different from the first service provider. The first service provider provide a first API for receiving a service from the SP server 150 and the second service provider provides a second API for receiving a service from the SP server 160. Typically, the first API and the second API are different from each other because the first service provider and the second service provider are different. A communication device should have both the first and second APIs so as to receive the services from both the SP servers 150, 160. Also, for example, the vendor of the MFP 10 is different from the first service provider and the second service provider.

For example, in order for the MFP 10 to receive the services from the respective SP servers 150, 160, the MFP 10 should have a plurality of APIs and thus have to store therein many programs. However, compared to a PC and the like, a storage capacity of the memory 34 of the MFP 10 is smaller. Therefore, in this illustrative embodiment, the API server 50 and the UL server 100 are provided so that the MFP 10 can receive the services from the respective SP servers 150, 160 without storing many programs in the MFP 10.

As described above, the API server 50 and the UL server 100 has a plurality of APIs corresponding to the SP servers 150, 160. The API server 50 performs a variety of communications (for example, a communication of commands 302, 312, 317 and the like shown in FIG. 6, which will be described later) with the respective SP servers 150, 160 by using the respective APIs corresponding to the respective SP servers 150, 160 so that the MFP 10 can receive the services from the respective SP servers 150, 160. That is, the UL server 100 performs a variety of communications (for example, a communication of a command 402 and the like shown in FIG. 7, which will be described later) with the respective SP servers 150, 160 by using the respective APIs corresponding to the respective SP servers 150, 160. Thereby, the MFP 10 can receive the services from the respective SP servers 150, 160 even though the MFP 10 does not have the respective APIs corresponding to the respective SP servers 150, 160 (i.e., even though the MFP 10 does not store therein many programs). Also, in the case that specifications of the SP servers 150, 160 are changed, when the programs of the API server 50 and the UL server 100 are changed, it is possible to cope with the specification change even though the program of the MFP 10 is not changed. Also, when the programs of the API server 50 and the UL server 100 are changed to have an API corresponding to a new SP server, the MFP 10 can receive a service from the new SP server even though the program of the MFP 10 is not changed.

Figure 2:
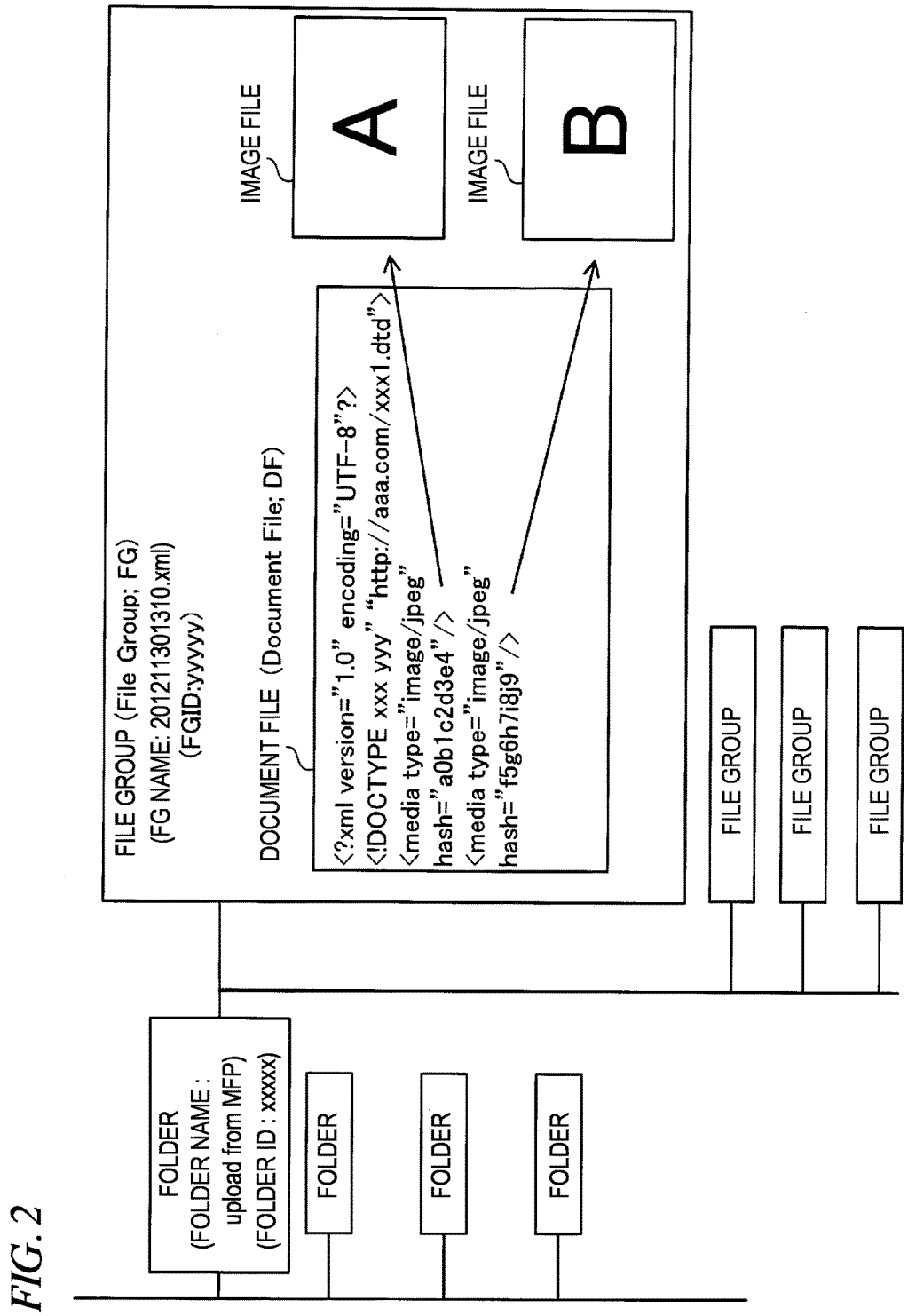
FIG. 2 shows a hierarchy structure of a folder and a file group in an SP server.

(Hierarchy Structure of Folder and File Group in SP Server 150: FIG. 2)

A user can receive a service from the SP server 150 by registering account information with the SP server 150. FIG. 2 shows an example of a plurality of folders and a plurality of file groups (hereinafter, referred to as 'FG (File Group)') corresponding to the account information registered by the user. An example of the SP server 150 adopting the hierarchy structure of the folder and FG may be 'Evernote (registered trademark)'. That is, in 'Evernote (registered trademark)', a notebook corresponds to the folder and a note corresponds to the FG.

Each folder has a folder name (for example, 'Upload from MFP') and a folder ID (for example, 'xxxxx'). The folder name is a name that is arbitrarily determined by a generation subject (for example, the user, the API server 50 and the like) of a new folder when the new folder is generated in the SP server 150. The folder ID is a unique ID that is determined by the SP server 150 when a new folder is generated in the SP server 150.

Each folder can store one or more FGs. Each FG has an FG name (for example, '201211301310.xml') and an FGID (for example, 'yyyyy'). The FG name is a name that is arbitrarily determined by a generation subject (for example, the user, the API server 50 and the like) of a new FG when the new FG is generated in the SP server 150. The FGID is a unique ID that is determined by the SP server 150 when a new FG is generated in the SP server 150.

Each FG includes at least a document file (hereinafter, referred to as 'DF (Document File)'). The DF is a file of an XML (eXtendible Markup Language) format and includes at least header data. The header data includes data (for example, '?xml version="1.0"') indicating a version of the XML, data (for example, 'encoding="UTF-8"?') indicating an encoding method and data (for example, '<! DOCTYPE xxx yyy http://aaa.com/xxx1.dtd">') for defining a document structure such as a document type and a specific description rule of a document.

Also, each FG can include one or more image files that are uploaded by the user. When the FG includes one or more image files, the DF further includes one or more text data for specifying the one or more image files, respectively. In an example of FIG. 2, since the FG includes two image files, the DF includes two text data. The text data for specifying an image file indicating an image 'A' includes data (for example, '<media type="image/jpeg"') indicating a type of the image file and data (for example, 'hash="a0b1c2d3e4"/>') indicating a hash value that is obtained by hashing (i.e., digesting) the image file. Also, the text data for specifying an image file indicating an image 'B' includes data (for example, '<media type="image/jpeg"') indicating a type of the image file and data (for example, 'hash="f5g6h7i8j9"/>') indicating a hash value that is obtained by hashing the image file.

Since the SP server 150 stores the hierarchy structure shown in FIG. 2, it can execute a following data providing service. A user accesses the SP server 150 by using a PC and the like, for example. In this case, the SP server 150 provides the PC with a list of folder names of a plurality of folders corresponding to account information of the user. Thereby, the user can see the list of folder names. In the meantime, the user can change a folder name of any one folder to another name. Typically, however, the user cannot see folder IDs of the respective folders and cannot change the folder IDs.

The user can select one folder name from the list of the folder names, thereby selecting one folder from the plurality of folders. In this case, the SP server 150 provides the PC with a list of FG names of a plurality of FGs included in the folder. Thereby, the user can see the list of FG names. In the meantime, the user can change an FG name of any one FG to another FG name. Typically, however, the user cannot see FGIDs of the respective FG and cannot change the FGIDs.

Also, the user can select one FG name from the list of the FG names, thereby selecting one FG from the plurality of FGs. In this case, the SP server 150 specifies an image file included in the FG by referring to a DF included in the FG. For example, in the example of FIG. 2, when the FG name '201211301310.xml' is selected, the SP server 150 specifies two image files included in the FG in accordance with two text data included in the DF. Then, the SP server 150 provides the PC with the two specified image files. Thereby, the user can see two images (i.e., two images indicating 'A' and 'B') indicated by the two image files.

In the meantime, the user can request the SP server 150 so that an image file (for example, an image file indicating 'A') included in a first FG is also included in a second FG. In this case, the SP server 150 adds text data for specifying the image file to a DF included in the second FG. Thereby, the DF included in the first FG and the DF included in the second FG include the same text data. That is, although the SP server 150 stores only one image file indicating 'A', the SP server can create a state where the image file is respectively included in the first FG and the second FG.

Figure 3:
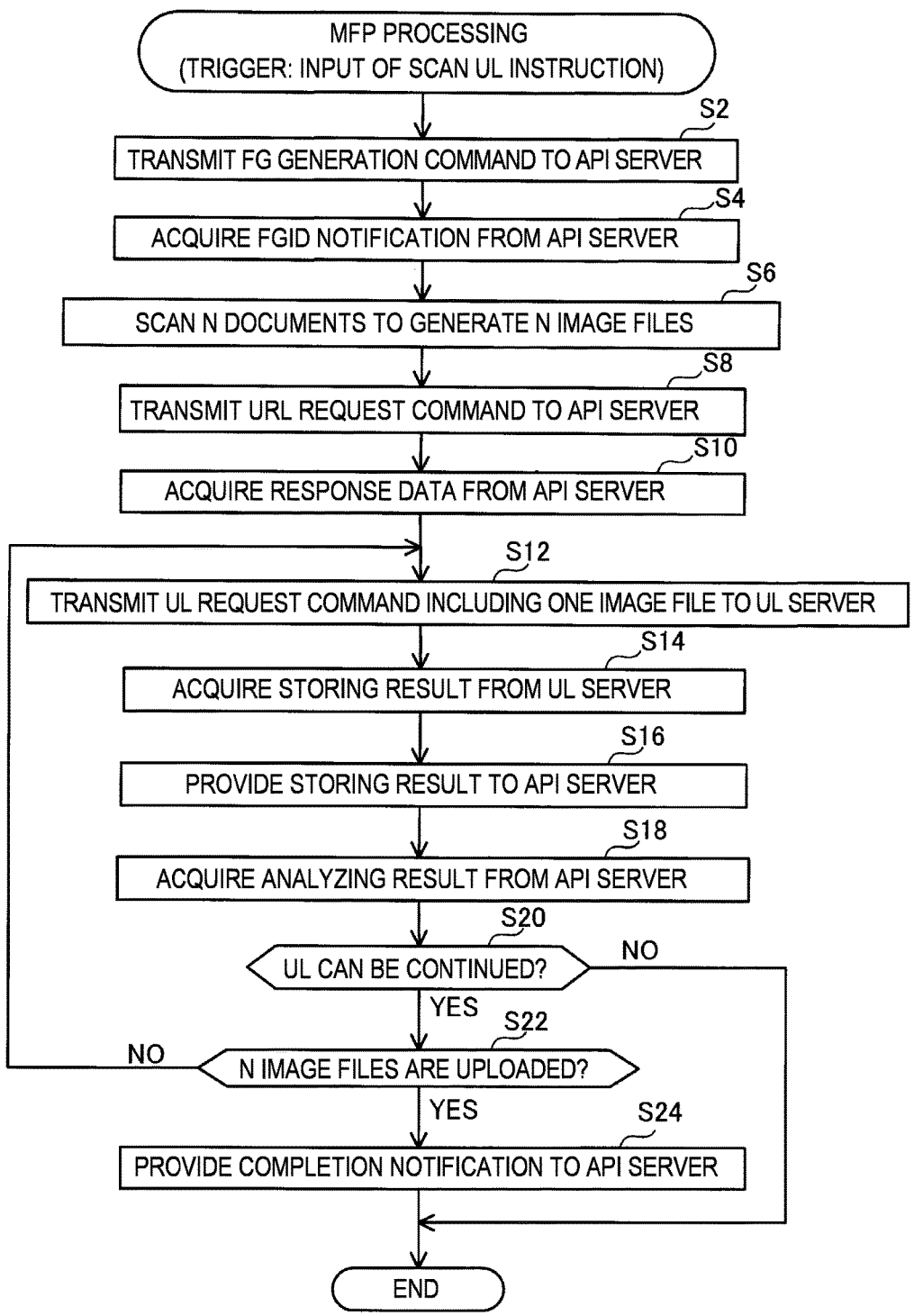
FIG. 3 is a flowchart of MFP processing.

(Processing Executed by MFP 10: FIG. 3)

The MFP 10 can scan a document to thus generate an image file and store the image file in the memory 34 of the MFP 10 (hereinafter, referred to as 'normal scan') and upload the image file to the SP servers 150, 160 (hereinafter, referred to as 'scan UL'). In the below, operations of the MFP 10 are described which are performed when the user executes a scan UL. The user selects 'scan' from 'copy', 'FAX' and 'scan' in a menu screen that is displayed on the display 14 of the MFP 10 and also selects 'scan UL' from 'normal scan' and 'scan UL'.

Then, the user selects one of a service name (for example, 'Evernote') corresponding to the SP server 150 and a service name (for example, 'Facebook') corresponding to the SP server 160. That is, the user selects any of the SP servers 150, 160 to which the image file is uploaded. The control unit 30 of the MFP 10 executes respective processing of FIG. 3 when the upload to the SP server 150 is selected.

In S2, the control unit 30 transmits an FG generation command to the API server 50. The FG generation command is a command for generating a new FG in the SP server 150. The FG generation command includes, as a request destination URL, a URL (hereinafter, referred to as 'specific URL') of the API server 50 beforehand stored in the memory 34 of the MFP 10. The FG generation command also includes a service name corresponding to the SP server 150 and an access token (hereinafter, referred to as 'AT (Access Token)') that is authentication information for receiving a service from the SP server 150.

When registering the account information (for example, a user ID, a password and the like) with the SP server 150, the user can acquire an AT from the SP server 150 and stores the AT in the MFP 10 in advance. Thereby, in S2, the control unit 30 can transmit the FG generation command including the AT to the API server 50. In the meantime, the AT is the authentication information that is generated based on the account information. Therefore, when a command (for example, a folder confirmation command of S102 of FIG. 4) including the AT is received, the SP server 150 can specify the account information corresponding to the AT.

Although specifically described later, when the FG generation command is received from the MFP 10, the API server 50 determines YES in S100 of FIG. 4, executes S102 to S124 and then provides an FGID notification to the MFP 10 (refer to S126). Thereby, in S4, an identification information acquisition unit 41 acquires an FGID notification from the API server 50. The FGID notification includes an FGID, three URLs (Uniform Resource Locators), a service name and an AT. The FGID included in the FGID notification is an FGID of a new FG generated in the SP server 150. The three URLs included in the FGID notification are URLs indicating positions in the API server 50 and request destination URLs for transmitting a command and information in S8, S16 and S24, which will be described later. The service name and AT included in the FGID notification are the same as the service name and AT included in the FG generation command transmitted in S2.

Then, in S6, the control unit 30 provides a scan instruction to the scan execution unit 20. The scan execution unit 20 scans N (N: an integer of 1 or larger) documents to thus generate N scan data. The control unit 30 executes predetermined processing (for example, compression processing and the like) for the N scan data to thus generate N image files. Thereby, the N image files that should be uploaded to the SP server 150 are generated.

In S8, the control unit 30 transmits a URL request command to the API server 50. The URL request command is a command for requesting the API server 50 to transmit a URL of the UL server 100. The URL request command includes, as a request destination URL, a first URL of the three URLs included in the FGID notification acquired in S4. The URL request command further includes respective information (i.e., the FGID, service name and AT) included in the FGID notification.

Although specifically described later, when the URL request command is received from the MFP 10, the API server 50 determines YES in S130 of FIG. 4 and provides response data to the MFP 10 (refer to S132). Thereby, in S10, the control unit 30 acquires the response data from the API server 50. The response data includes the URL of the UL server 100 and the respective information (i.e., the FGID and AT) included in the URL request command.

Meanwhile, in this illustrative embodiment, the control unit 30 executes the respective processing of S8 and S10, thereby acquiring the URL of the UL server 100 from the API server 50. In a modified embodiment, the FGID notification acquired in S4 may include the URL of the UL server 100. In this case, the control unit 30 can acquire the URL of the UL server 100 from the API server 50 by acquiring the FGID notification in S4 even without executing the respective processing of S8 and S10.

Then, in S12, an upload command transmission unit 42 transmits a UL request command to the UL server 100. The UL request command includes, as a request destination URL, the URL of the UL server 100 included in the response data acquired in S10. The UL request command further includes one image file, which is not yet uploaded, of the N image files generated in S6 and the respective information (i.e., the FGID and AT) included in the response data acquired in S10.

Although specifically described later, when the UL request command is received from the MFP 10, the UL server 100 determines YES in S200 of FIG. 5, executes S202 to S210 and then provides the MFP 10 with a storing result indicating whether the upload succeeds (refer to S212). Thereby, in S14, the control unit 30 acquires the storing result from the UL server 100. As described below, when the storing result is analyzed by the API server 50, one analyzing result indicating whether an upload of the image file succeeds is obtained. In the meantime, a situation where the upload of the image file fails may be a situation where when the image file is uploaded, a data capacity exceeds a data size (i.e., a data size in the SP server 150) that can be used by a user, for example.

In S16, the control unit 30 provides the API server 50 with the storing result acquired in S14. The storing result includes, as the request destination URL, a second URL of the three URLs included in the FGID notification acquired in S4.

Although specifically described later, when the storing result is received from the MFP 10, the API server 50 determines YES in S140 of FIG. 4, analyzes the storing result (refer to S142) and provides an analyzing result to the MFP 10 (refer to S144). Thereby, in S18, the control unit 30 acquires the analyzing result from the API server 50. In this illustrative embodiment, since the MFP 10 does not have a program for analyzing the storing result, the API server 50 is caused to analyze the storing result. However, in a modified embodiment, the MFP 10 may have a program for analyzing the storing result. In this case, the respective processing of S16 and S18 may be omitted.

Then, in S20, the control unit 30 determines whether the upload of the image file can be continued, based on the analyzing result acquired in S18. When the analyzing result indicates that the upload succeeds, the control unit 30 determines that the upload of the image file can be continued (YES in S20) and proceeds to S22. On the other hand, when the analyzing result indicates that the upload fails, the control unit 30 determines that the upload of the image file cannot be continued (NO in S20), skips over S22 and S24 and ends the processing of FIG. 3.

In S22, the control unit 30 determines whether all the upload of the N image files generated in S6 is completed. When all the upload of the N image files is completed, the control unit 30 proceeds to S24. On the other hand, when all the upload of the N image files is not completed, the control unit 30 again executes the respective processing of S12 to S22. When all the upload of the N image files succeeds, the control unit repeats the respective processing of S12 to S22 N times, determines YES in the processing of Nth S22 and proceeds to S24.

In S24, the control unit 30 transmits a completion notification, which indicates that all the upload of the N image files is completed, to the API server 50. The completion notification includes, as the request destination URL, a third URL of the three URLs included in the FGID notification acquired in S4. The completion notification further includes the respective information (i.e., the FGID, service name and AT) included in the FGID notification.

Although specifically described later, when the completion notification is received from the MFP 10, the API server 50 determines YES in S150 of FIG. 4 and executes respective processing for changing a name of the FG (refer to S152 to S158).

(Processing Executed by API Server 50: FIG. 4)

Subsequently, processing that is executed by the control unit 70 of the API server 50 is described with reference to FIG. 4. The respective processing of FIG. 4 is implemented according to the application program for the API server 50 and the API corresponding to the SP server 150. The application program includes an HTTP (Hyper Text Transfer Protocol) program for performing HTTP communication. The respective processing (i.e., S100, S126, S130, S132, S140, S144, S150) for communicating with the MFP 10 is executed according to the HTTP program. In the meantime, the respective processing (i.e., S102 to S124, S152 to S158) for communicating with the SP server 150 is executed according to the API corresponding to the SP server 150.

In S100, S130, S140 and S150, the control unit 70 monitors whether a variety of information is received (acquired) from the MFP 10. Specifically, the control unit 70 determines whether any type of the information is received by referring to the request destination URL included in the information received from the MFP 10. That is, when the FG generation command (refer to S2 of FIG. 3) including the specific URL is received, a generation command reception unit 81 determines YES in S100 and proceeds to S102. Also, when the URL request command (refer to S8 of FIG. 3) including the first URL is received, the control unit 70 determines YES in S130 and proceeds to S132. Also, when the storing result (refer to S16 of FIG. 3) including the second URL is received, the control unit 70 determines YES in S140 and proceeds to S142. Also, when the completion notification (refer to S24 of FIG. 3) including the third URL is received, the control unit 70 determines YES in S150 and proceeds to S152. In the meantime, in a time period during which the various information is not received from the MFP 10, the control unit 70 continues to determine NO in S100, S130, S140 and S150 (that is, the control unit 70 monitors whether the various information is received).

As described above, the FG generation command received in S100 includes the service name corresponding to the SP server 150 and the AT (refer to the descriptions of S2 in FIG. 3). In S102, the control unit 70 refers to the service name included in the FG generation command to thus determine that the image file should be uploaded to the SP server 150 of the SP servers 150, 160. Then, the control unit 70 transmits a folder confirmation command to the SP server 150. The folder confirmation command is a command for confirming whether a folder (hereinafter, referred to as 'target folder') having a folder name 'Upload from MFP' exists in the SP server 150. The folder confirmation command includes the AT that is included in the FG generation command received in S100. In the meantime, when the processing of S112 (which will be described later) has been executed, the target folder may exist in the SP server 150.

When the folder confirmation command is received from the API server 50, the SP server 150 specifies the account information to which the AT included in the folder confirmation command corresponds. Then, the SP server 150 determines whether the target folder having the folder name 'Upload from MFP' exists in a plurality of folders corresponding to the specified account information. When it is determined that the target folder exists, the SP server 150 provides the API server 50 with a folder confirmation result indicating that the target folder exists. When it is determined that the target folder does not exist, the SP server 150 provides the API server 50 with a folder confirmation result indicating that the target folder does not exist.

In S104, the control unit 70 acquires the folder confirmation result from the SP server 150. Then, in S110, the control unit 70 determines whether the folder confirmation result indicating that the target folder exists is acquired or the folder confirmation result indicating that the target folder does not exist is acquired. When the folder confirmation result indicating that the target folder exists is acquired, the control unit 70 determines YES in S110, skips over S112 and proceeds to S114. On the other hand, when the folder confirmation result indicating that the target folder does not exist is acquired, the control unit 70 determines NO in S110 and proceeds to S112.

In S112, the control unit 70 transmits a folder generation command to the SP server 150. The folder generation command is a command for requesting the SP server 150 to generate a new folder (i.e., a target folder). The folder generation command includes the preset folder name 'Upload from MFP' and the AT included in the FG generation command received in S100.

When the folder generation command is received from the API server 50, the SP server 150 specifies the account information to which the AT included in the folder generation command corresponds. Then, the SP server 150 generates a new folder corresponding to the specified account information. Also, the SP server 150 determines the folder name 'Upload from MFP' included in the folder generation command as a folder name of the new folder. Then, the SP server 150 determines a unique folder ID as a folder ID of the new folder. When the new folder (i.e., a target folder having the folder name 'Upload from MFP') is generated as described above, the SP server 150 can generate a new FG (file group; refer to FIG. 2) in the new folder and can store the image file so that the image file is included in the new FG. Meanwhile, the FG of the upload target is hereinafter referred to as 'target FG'.

After the control unit 70 determines YES in S110 or after S112, the control unit 70 transmits a folder ID request command to the SP server 150 in S114. The folder ID request command is a command for requesting the SP server 150 to transmit a folder ID of the target folder. The folder ID request command includes the folder name 'Upload from MFP' and the AT included in the FG generation command received in S100.

When the folder ID request command is received from the API server 50, the SP server 150 specifies the account information to which the AT included in the folder ID request command corresponds. Then, the SP server 150 specifies a folder ID of the target folder having the folder name 'Upload from MFP' included in the folder ID request command from the plurality of folder IDs of the plurality of folders corresponding to the specified account information. Then, the SP server 150 provides the specified folder ID to the API server 50.

In S116, the control unit 70 acquires the folder ID from the SP server 150. Then, in S118, a generation unit 82 generates a new DF (document file; refer to FIG. 2). In the below, the DF generated in S118 is referred to as 'initial DF'. The initial DF does not include text data corresponding to the image file and includes only the header data.

Then, in S120, the generation unit 82 generates an FG name of the new FG (i.e., the target FG). Specifically, the generation unit 82 generates an FG name indicating a character string of 'Uploading'. Thereby, if the user sees the FG name indicating 'Uploading', the user can know that the image file is being uploaded to the target FG. In the below, the FG name that is generated in S120 is referred to as 'temporary FG name'.

Then, in S122, a storing control unit 83 transmits an FGID request command to the SP server 150. The FGID request command is a command for requesting the SP server 150 to generate a new FG (i.e., a target FG) and to transmit an FGID of the new FG. The FGID request command includes the folder ID acquired in S116, the initial DF generated in S118, the temporary FG name generated in S120 and the AT included in the FG generation command received in S100.

When the FGID request command is received from the API server 50, the SP server 150 specifies the account information to which the AT included in the FGID request command corresponds. Then, the SP server 150 specifies a target folder having the folder ID included in the FGID request command from the plurality of folders corresponding to the specified account information. Then, the SP server 150 generates a new FG in the specified target folder. In the below, the FG that is here generated is referred to as 'initial FG'. The initial FG includes the initial DF that is included in the FGID request command. However, at this time, the initial FG does not include any image file. The SP server 150 determines the temporary FG name included in the FGID request command, as an FG name of the initial FG. Also, the SP server 150 determines the unique FGID, as an FGID of the initial FG. Then, the SP server 150 provides the FGID of the initial FG to the API server 50.

Then, in S124, the control unit 70 acquires the FGID from the SP server 150. Then, in S126, an identification information provision unit 84 provides an FGID notification to the MFP 10. The FGID notification includes the FGID received in S124, the first to third URLs and the respective information (i.e., the service name and AT) included in the FG generation command received in S100. Thereby, in S4 of FIG. 3, the MFP 10 acquires the FGID notification from the API server 50. In the meantime, the first to third URLs are beforehand stored in the memory 74 of the API server 50.

As described above, the URL request command received in S130 includes the FGID, the service name and the AT (refer to the descriptions of S8 in FIG. 3). In S132, a position information provision unit 86 provides the response data to the MFP 10. The response data includes the URL of the UL server 100, which is beforehand stored in the memory 74 of the API server 50, and the respective information (i.e., the FGID and AT) included in the URL request command. Thereby, in S10 of FIG. 3, the MFP 10 acquires the response data from the API server 50.

When the storing result is acquired in S140, the control unit 70 analyzes the storing result to thereby generate an analyzing result in S142. The analyzing result has a data format that can be interpreted by the MFP 10. In S144, the control unit 70 provides an analyzing result to the MFP 10. Thereby, in S18 of FIG. 3, the MFP 10 acquires the analyzing result from the API server 50.

As described above, the completion notification acquired in S150 includes the FGID, the service name and the AT (refer to the descriptions of S24 in FIG. 3). In S152, the control unit 70 can know that the upload of each image file to the SP server 150 of the SP servers 150, 160 is completed by referring to the service name included in the completion notification. Then, the control unit 70 transmits a DF request command to the SP server 150. The DF request command is a command for requesting the SP server 150 to transmit a DF (hereinafter, referred to as 'final DF') including the respective text data corresponding to the respective uploaded image files. The DF request command includes the respective information (i.e., the FGID and AT) included in the completion notification acquired in S150.

When the DF request command is received from the API server 50, the SP server 150 specifies the account information to which the AT included in the DF request command corresponds. Then, the SP server 150 specifies an FG (i.e., a target FG) having the FGID included in the DF request command from the plurality of FGs included in the plurality of folders corresponding to the specified account information. Then, the SP server 150 provides the API server 50 with the final FG included in the specified target FG.

Then, in S154, the control unit 70 acquires the final DF and the current FG name from the API server 50. In the meantime, the current FG name of the target FG is a temporary FG name indicating 'Uploading' (refer to S120). In S156, a name change unit 85 generates a new FG name of the target FG. Specifically, the name change unit 85 generates an FG name indicating current time and date. In the below, the FG name generated in S156 is referred to as 'definitive FG name'.

Then, in S158, the name change unit 85 transmits a name change command to the SP server 150. The name change command is a command for requesting the SP server 150 to change the FG name of the target FG (i.e., to change the temporary FG name to the definitive FG name). The name change command includes the final DF acquired in S154, the definitive FG name generated in S156 and the respective information (i.e., the FGID and AT) included in the completion notification acquired in S150.

When the name change command is received from the API server 50, the SP server 150 specifies the account information to which the AT included in the name change command corresponds. Then, the SP server 150 specifies a target FG having the FGID included in the name change command from the plurality of FGs included in the plurality of folders corresponding to the specified account information. Then, the SP server 150 changes the FG name of the specified target FG from the temporary FG name to the definitive FG name included in the name change command. Thereby, when the user sees the FG name indicating the time and date, the user can know the time and date at which the image file is uploaded to the target FG.

(Processing Executed by UL Server 100: FIG. 5)

Subsequently, the processing that is executed by the UL server 100 is described with reference to FIG. 5. The respective processing of FIG. 5 is implemented according to the application program stored in the memory 124 of the UL server 100. The application program includes an HTTP program for performing HTTP communication. The respective processing (i.e., S200, S212) for communicating with the MFP 10 is executed according to the HTTP program. On the other hand, the respective processing (i.e., S202 to S210) for communicating with the SP server 150 is executed according to the API corresponding to the SP server 150.

In S200, an upload command reception unit 131 monitors whether the UL request command (refer to S12 of FIG. 3) is received from the MFP 10. When the UL request command is received, the upload command reception unit 131 determines YES in S200 and proceeds to S202. In the meantime, for a time period during which the UL request command is not received from the MFP 10, the control unit 70 continues to determine NO in S200 (i.e., the control unit continues to monitor whether the UL request command is received).

As described above, the UL request command received in S200 includes the FGID, one image file and the AT (refer to the descriptions of S12 in FIG. 3). In S202, a file acquisition unit 141 transmits a DF request command to the SP server 150. The DF request command is a command for requesting the SP server 150 to transmit a current DF (hereinafter, referred to as 'current DF') included in the target FG. The DF request command includes the respective information (i.e., the FGID and AT) included in the UL request command received in S200.

When the DF request command is received from the UL server 100, the SP server 150 specifies the account information to which the AT included in the DF request command corresponds. Then, the SP server 150 specifies a target FG having the FGID included in the DF request command from the plurality of FGs included in the plurality of folders corresponding to the specified account information. Then, the SP server 150 provides the current DF included in the specified target FG to the UL server 100.

Then, in S204, the file acquisition unit 141 acquires the current FG from the SP server 150. For example, when the number of uploaded image files of the N image files generated in S6 of FIG. 3 is zero, the current DF acquired in S204 is the initial DF (refer to S118 of FIG. 4). Also, for example, when the number of uploaded image files of the N image files is M (M is an integer of 1 or larger and smaller than N), the current DF acquired in S204 is that the M text data for specifying the M image files is added to the initial DF.

Then, in S206, an addition unit 142 generates data (for example, '<media type="image/jpeg"') indicating a type of one image file included in the UL request command received in S200. In S206, the addition unit 142 further hashes the image file to thus generate data (for example, 'hash="a0b1c2d3e4"/>') indicating a hash value. Thereby, the addition unit 142 can generate one text data (a combination of the data indicating a type of the image file and the data indicating a hash value). Then, the addition unit 142 adds the generated text data to the current DF acquired in S204, thereby generating changed DF.

Also, in S208, a file provision unit 143 provides the SP server 150 with the one image file included in the UL request command received in S200, the changed DF generated in S206 and the respective information (i.e., the FGID and AT) included in the UL request command acquired in S200.

When the FGID, the image file, the changed DF and the AT are acquired from the UL server 100, the SP server 150 specifies the account information to which the AT corresponds. Then, the SP server 150 specifies a target FG having the FGID from the plurality of FGs included in the plurality of folders corresponding to the specified account information. Then, the SP server 150 changes the current DF included in the specified target FG to the changed DF. Also, the SP server 150 stores the image file. Thereby, one image file is uploaded.

When the upload of the image file succeeds, the SP server 150 provides the UL server 100 with a storing result indicating that the upload succeeds. On the other hand, when the image file is uploaded and a data capacity thus exceeds the data size in the SP server 150 that can be used by the user, the SP server 150 provides the UL server 100 with a storing result indicating that the upload fails, without storing the image file.

Then, in S210, the control unit 120 acquires the storing result from the SP server 150. Then, in S212, a result information provision unit 133 provides the storing result acquired in S210 to the MFP 10. Thereby, in S16 of FIG. 3, the MFP 10 acquires the storing result from the UL server 100.

When the processing of S212 is over, the control unit 120 returns to S200. Whenever the UL request command is received from the MFP 10, the control unit 120 executes the respective processing of S202 to S212. That is, the control unit 120 sequentially receives the N UL request commands including the N image files, respectively, and uploads each of the N image files to the SP server 150.

Figure 6:
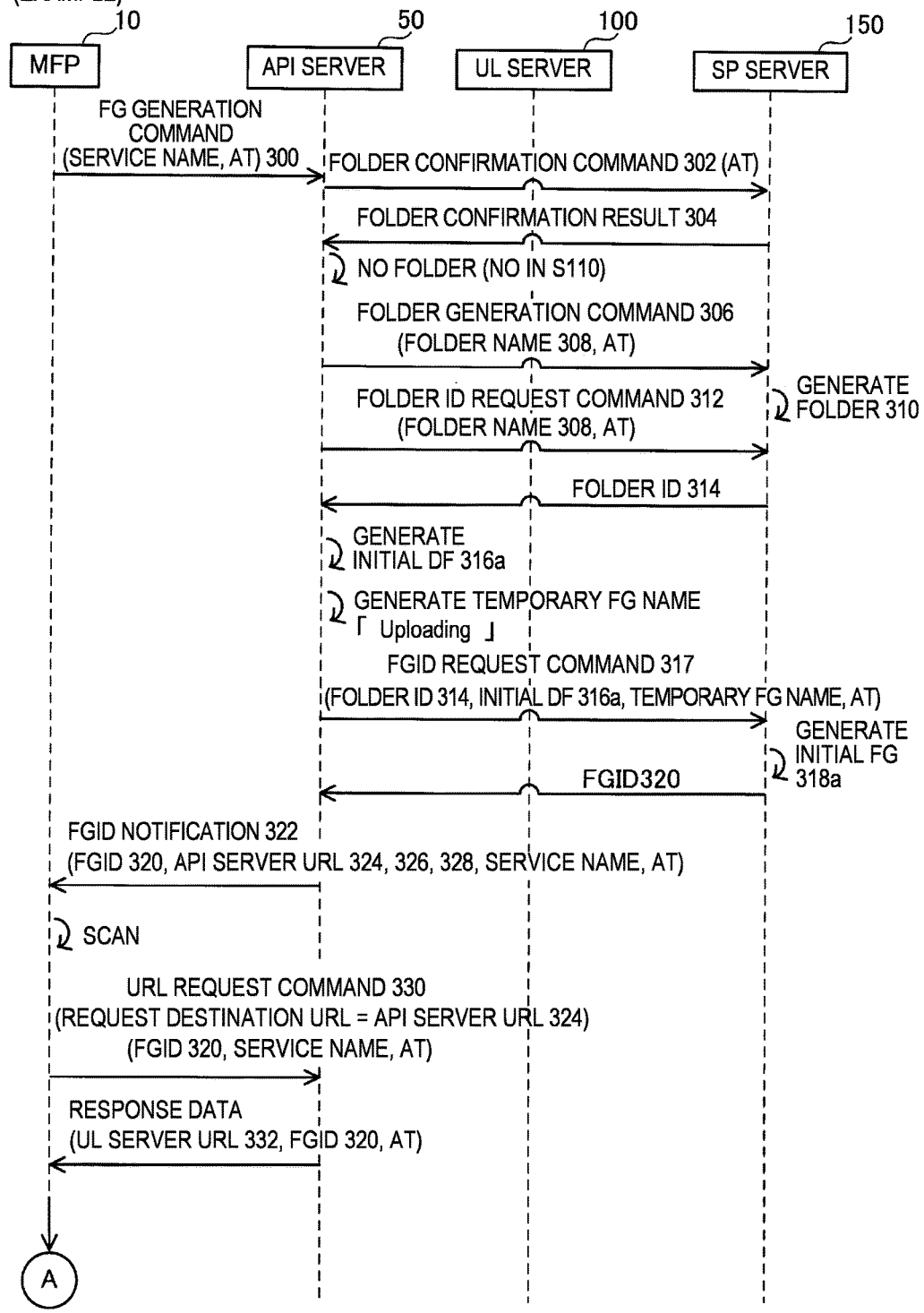
FIG. 6 is a sequence diagram of respective processing that is executed by respective devices of an illustrative embodiment.
Figure 7:
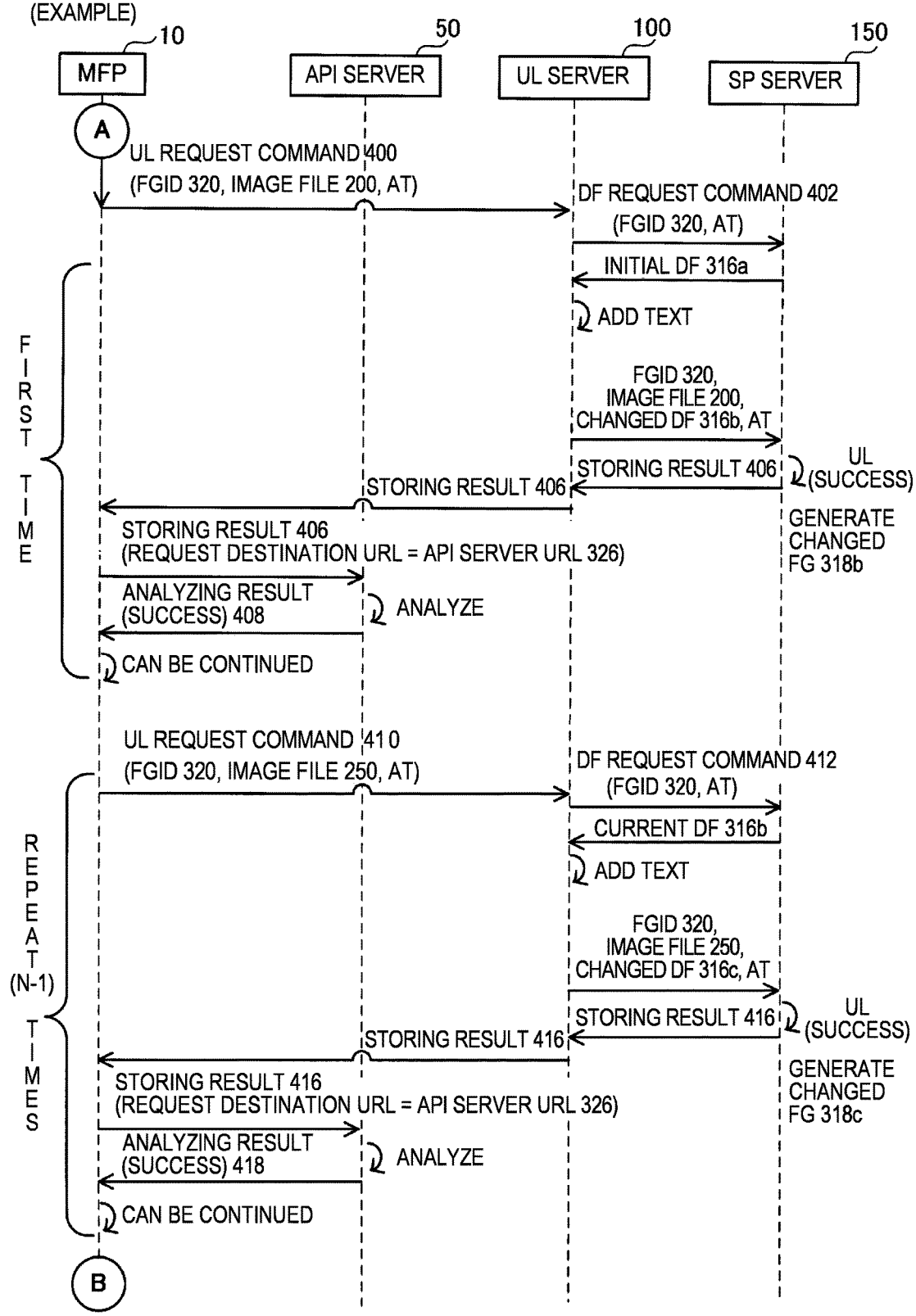
FIG. 7 is a sequence diagram continuing to FIG. 6.

Specific Examples; FIGS. 6 to 8

Subsequently, specific examples of the respective processing that is executed by the respective devices 10, 50, 100, 150 are described with reference to FIGS. 6 to 8. The respective devices 10, 50, 100 execute the flowcharts of FIGS. 3 to 5, so that the respective processing of FIGS. 6 to 8 is implemented.

The MFP 10 transmits an FG generation command 300 to the API server 50 (S2 of FIG. 3). The FG generation command includes the service name corresponding to the SP server 150 and the AT.

When the FG generation command 300 is received (YES in S100 of FIG. 4), the API server 50 transmits a folder confirmation command 302 including the AT to the SP server 150 (S102).

When the folder confirmation command 302 is received, the SP server 150 determines whether there is a target folder having a folder name 'Upload from MFP' and provides a folder confirmation result 304 to the API server 50. In the example of FIG. 6, since the target folder does not exist, the folder confirmation result 304 indicates that there is no target folder.

When the folder confirmation result 304 is acquired (S104 of FIG. 4), the API server 50 determines that there is no target folder in the SP server 150 (NO in S110). Then, the API server 50 transmits a folder generation command 306 including a folder name 308 of 'Upload from MFP' and AT to the SP server 150 (S112).

When the folder generation command 306 is received, the SP server 150 generates a new folder 310 (i.e., a target folder 310) having the folder name 308. At this time, the SP server 150 determines a folder ID 314 of the folder 310.

Figure 4:
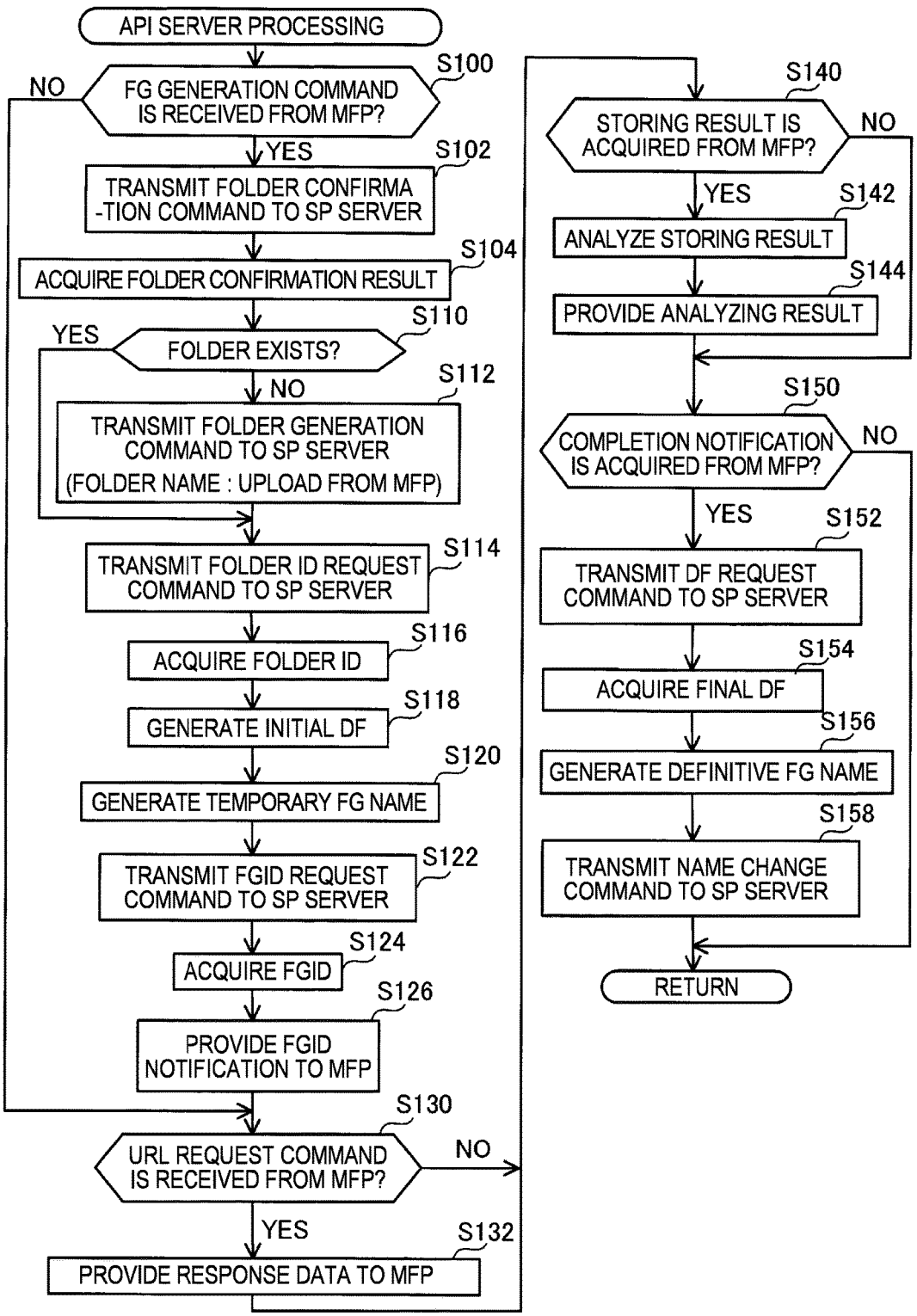
FIG. 4 is a flowchart of API server processing.

After transmitting the folder generation command 306, the API server 50 transmits a folder ID request command 312 including the folder name 308 and AT to the SP server 150 (S114 of FIG. 4).

When the folder ID request command 312 is received, the SP server 150 provides a folder ID 314 of the target folder 310 to the API server 50.

Figure 10A:
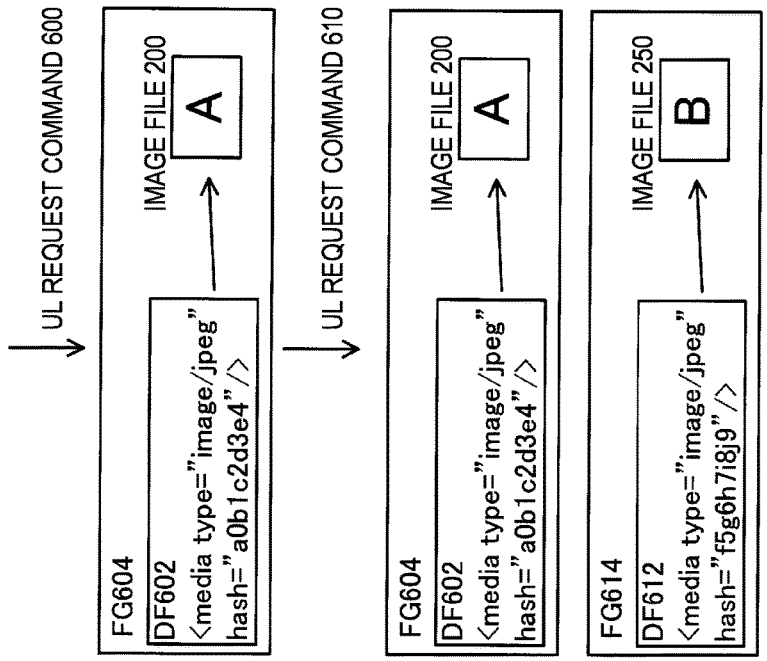
FIGS. 10A and 10B show an illustrative embodiment and a comparative example.

When the folder ID is acquired (S116 of FIG. 4), the API server 50 generates an initial DF 316a (S118 of FIG. 4). In the meantime, FIG. 10A shows an example of the initial DF 316a. The initial DF 316a does not include text data for specifying an image file. The API server 50 also generates a temporary FG name 'Uploading' (S120). Then, the API server 50 transmits an FGID request command 317 including the folder ID 314, initial DF 316a, temporary FG name and AT to the SP server 150 (S122).

When the FGID request command 317 is received, the SP server 150 generates an initial FG 318a (refer to FIG. 10A) in the target folder 310 having the folder ID 314 included in the FGID request command 317. The initial FG 318a includes the initial DF 316a included in the FGID request command 317 but does not include any image file. Then, the SP server 150 determines the temporary FG name included in the FGID request command 317, as an FG name of the initial FG 318a. Also, the SP server 150 determines an FGID 320 of the initial FG 318a and provides the FGID 320 to the API server 50.

When the FGID 320 is acquired (S124 of FIG. 4), the API server 50 provides the MFP 10 with an FGID notification 322 including the FGID 320, three URLs (i.e., a first URL 324, a second URL 326 and a third URL 328) of the API server, service name and AT (S126).

When the FGID notification 322 is acquired (S4 of FIG. 3), the MFP 10 generates N image files (S6). Then, the MFP 10 transmits a URL request command 330 including the first URL 324 (refer to the FGID notification 322) as a request destination URL to the API server 50 (S8). The URL request command 330 includes the FGID 320, the service name and the AT.

When the URL request command 330 is received (YES in S130 of FIG. 4), the API server 50 provides the MFP 10 with response data including a UL server URL 332, FGID 320 and AT (S132).

As shown in FIG. 7, when the response data is acquired (S10 of FIG. 3), the MFP 10 transmits a UL request command 400 including the UL server URL 332 as a request destination URL to the UL server 100 (S12). The UL request command 400 includes the FGID 320, one image file 200 and the AT.

When the UL request command 400 is received (YES in S200 of FIG. 5), the UL server 100 transmits a DF request command 402 including the FGID 320 and AT to the SP server 150 (S202).

When the DF request command 402 is received, the SP server 150 specifies the initial FG 318a having the FGID 320 included in the DF request command 402 and provides the initial DF 316a included in the specified initial FG 318a to the UL server 100.

When the initial DF 316a is acquired (S204 of FIG. 5), the UL server 100 adds text data for specifying the image file 200 to the initial DF 316a (S206). Thereby, a changed DF 316b is generated. As shown in FIG. 10A, the changed DF 316b includes one text data for specifying the image file 200. Then, the UL server 100 provides the FGID 320, the image file 200, the changed DF 316b and the AT to the SP server 150 (S208).

When the FGID 320, the image file 200, the changed DF 316b and the AT are acquired, the SP server 150 specifies the initial FG 318a in the SP server 150, based on the AT and the FGID 320. Then, the SP server 150 changes the initial DF 316a included in the specified initial FG 318a to the changed DF 316b and stores the image file 200, thereby generating a changed FG 318b. As shown in FIG. 10A, the changed FG 318b includes the changed DF 316b and the image file 200. Then, the SP server 150 provides the UL server 100 with a storing result 406 indicating that the upload succeeds.

When the storing result 406 is acquired (S210 of FIG. 5), the UL server 100 provides the storing result 406 to the MFP 10 (S212).

When the storing result 406 is acquired (S14 of FIG. 3), the MFP 10 provides the storing result 406 including the second URL 326 (refer to the FGID notification 322 of FIG. 6) as a request destination URL to the API server 50 (S16).

When the storing result 406 is acquired (YES in S140 of FIG. 4), the API server 50 analyzes the storing result 406 (S142). Then, the API server 50 provides an analyzing result indicating that the upload succeeds to the MFP 10 (S144).

When the analyzing result 408 is acquired (S18 of FIG. 3), the MFP 10 determines whether the image file can be continuously uploaded, based on the analyzing result 408 (S20). Here, the MFP 10 determines that the upload can be continued (YES in S20). Then, the MFP 10 transmits a UL request command 410 including the UL server URL 332 as a request destination URL to the UL server 100 (S12). The UL request command 410 includes the FGID 320, one image file 250 and the AT.

Figure 5:
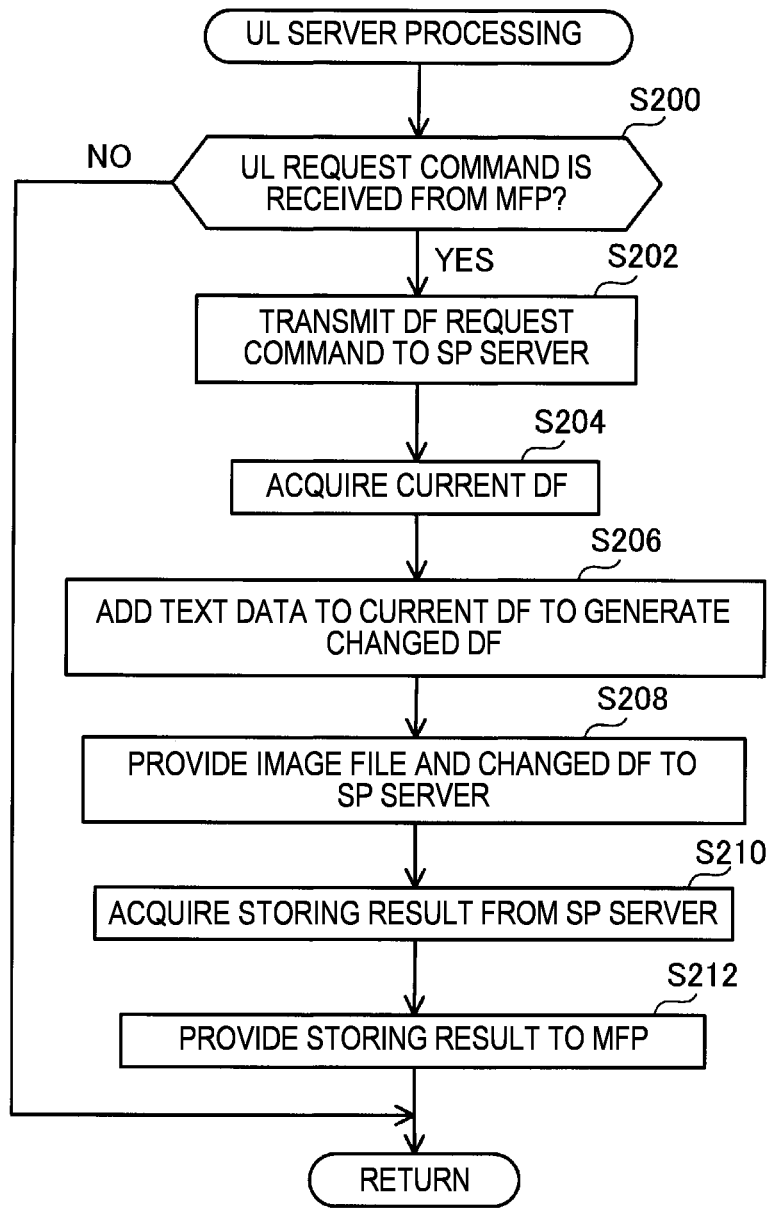
FIG. 5 is a flowchart of UL server processing.

When the UL request command 410 is received (YES in S200 of FIG. 5), the UL server 100 transmits a DF request command 412 including the FGID 320 and AT to the SP server 150 (S202 of FIG. 5).

When the DF request command 412 is received, the SP server 150 specifies a current FG 318b having the FGID 320 included in the DF request command 412 and provides a current DF 316b included in the specified current FG 318b to the UL server 100.

When the current DF 316b is acquired (S204 of FIG. 5), the UL server 100 adds text data for specifying the image file 200 to the current DF 316b (S206). Thereby, a changed DF 316c is generated. As shown in FIG. 10A, the changed DF 316c includes two text data for specifying two image files 200, 250. Then, the UL server 100 provides the FGID 320, the image file 250, the changed DF 316c and the AT to the SP server 150 (S208).

When the FGID 320, the image file 250, the changed DF 316c and the AT are acquired, the SP server 150 specifies the current FG 318b in the SP server 150, based on the AT and the FGID 320. Then, the SP server 150 changes the current DF 316b included in the specified current FG 318b to the changed DF 316c and stores the image file 250, thereby generating a changed FG 318c. As shown in FIG. 10A, the changed FG 318c includes the changed DF 316c and the two image files 200, 250. Then, the SP server 150 provides a storing result 416 indicating that the upload succeeds to the UL server 100.

Similar to the storing result 406, the storing result 416 is provided from the UL server 100 to the API server 50 via the MFP 10. As a result, an analyzing result 418 is provided from the API server 50 to the MFP 10. The respective processing from the communication of the UL request command 410 to the communication of the analyzing result 418 is repeated (N−1) times. That is, the respective processing is repeated until all of the N image files are uploaded.

(Case A)

Figure 8A:
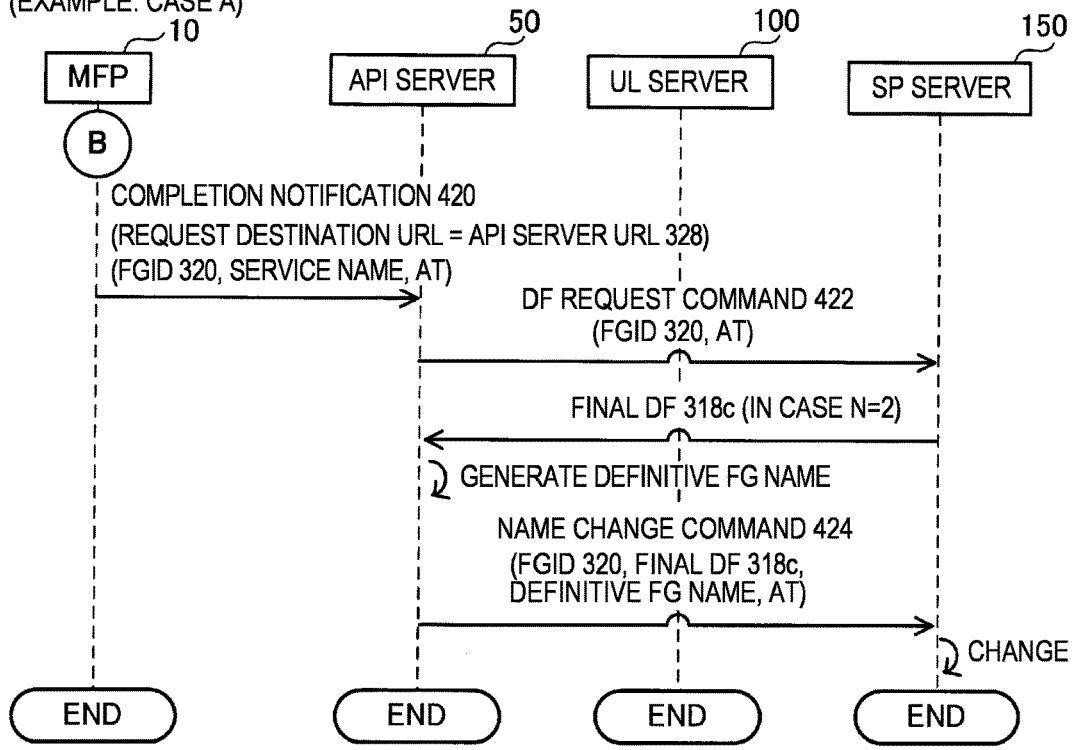
FIGS. 8A and 8B are a sequence diagram of a case A where an upload succeeds and a sequence diagram of a case B where an upload fails.
Figure 8B:
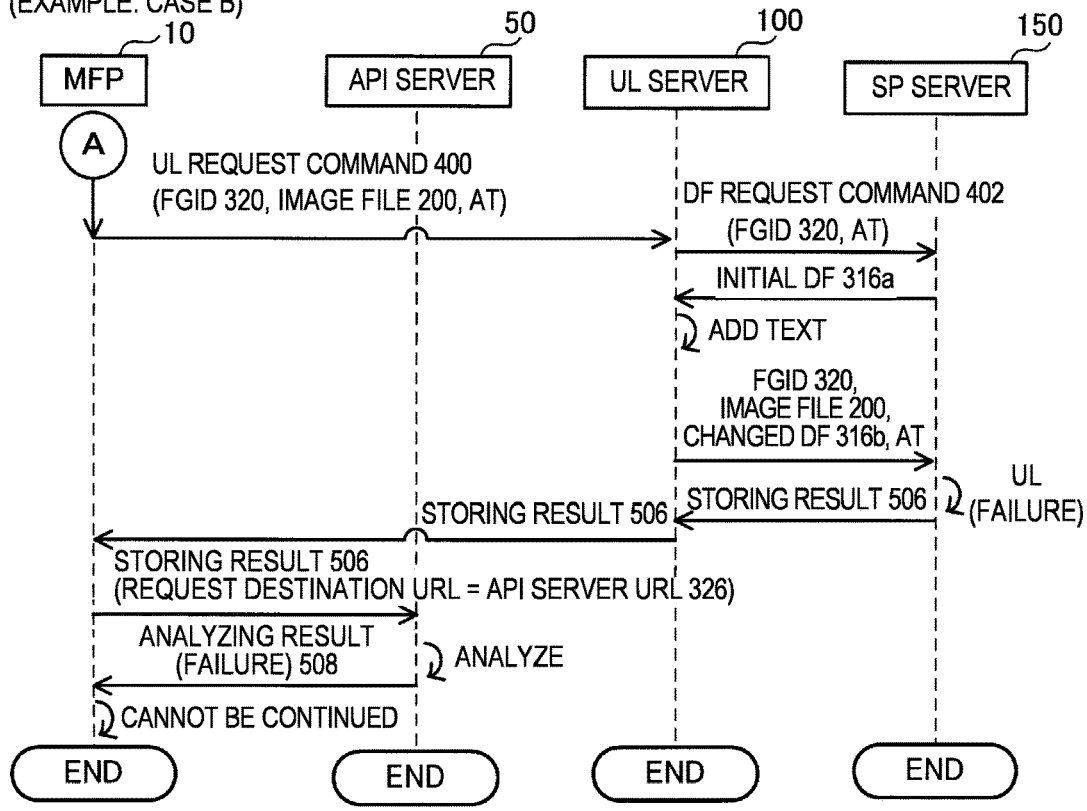

In the below, a case A of FIG. 8A is described in which N is 2. That is, when the upload of the image files 200, 250 is completed, all upload of the N image files is completed. Therefore, the changed DF 316c shown in FIG. 10A is a final DF (refer to S154 of FIG. 4) including N text data for specifying N image files.

As shown in the case A of FIG. 8A, the MFP 10 provides a completion notification 420 including the third URL 328 (refer to the FGID notification 322 of FIG. 6) as a request destination URL to the API server 50 (S24 of FIG. 3). The completion notification 420 includes the FGID 320, the service name and the AT.

When the completion notification 420 is acquired (YES in S150 of FIG. 4), the API server 50 transmits a DF request command 422 including the FGID 320 and AT to the SP server 150 (S152).

When the DF request command 422 is received, the SP server 150 provides a final DF 316c to the API server 50.

When the final DF 316c is acquired (S154 of FIG. 4), the API server 50 generates a definitive FG name indicating current time and date (S156). Then, the API server 50 transmits a name change command 424 including the FGID 320, final DF 316c, definitive FG name and AT to the SP server 150 (S158).

When the name change command 424 is received, the SP server 150 specifies the current FG 318c in the SP server 150, based on the FGID 320 and AT included in the name change command 424. Then, the SP server 150 changes a name of the specified current DF 318c from the temporary FG name to the normal FG name.

That is, in this illustrative embodiment, the temporary FG name 'Uploading' is used as the FG name of the target FG (i.e., the FG 318a, 318b) until the upload of the N image file is completed. Therefore, when the user accesses the SP server 150 by using the PC and the like, for example, the user can see the temporary FG name and thus know that the target FG having the temporary FG name is under upload of the image file. Hence, an operation interrupting the upload (for example, an operation for uploading another file to the target FG an operation for acquiring a file from the target FG and the like) can be suppressed from being executed by the user. Also, when the upload of the N image files is completed, the definitive FG name is used as the FG name of the target FG (i.e., the FG 318c). As a result, the user can know the completion of the upload of the image files and the time and date at which the upload is executed by confirming the definitive FG name.

(Case B)

In the case of FIG. 7, the upload of the respective image files 200, 250 succeeds. In contrast, in a case B of FIG. 8B, the upload of the image file 200 fails. In the case B, the processing from the transmission of the UL request command 400 from the MFP 10 to the UL server 100 to the provision of the FGID 320, the changed DF 316b, the image file 200 and the AT from the UL server 100 to the SP server 150 is the same as the case of FIG. 7.

When the image file 200 is uploaded, the data capacity exceeds the data size in the SP server 150 that can be used by the user. As a result, the SP server 150 cannot upload the image file 200. Therefore, the SP server 150 provides a storing result 506 indicating that the upload fails to the UL server 100.

The storing result 506 is provided from the UL server 100 to the API server 50 via the MFP 10. As a result, an analyzing result 508 is provided from the API server 50 to the MFP 10. When the analyzing result 508 is acquired (S18 of FIG. 3), the MFP 10 determines that the upload of the image file cannot be continued, based on the analyzing result 508 (NO in S20). In this case, the MFP 10 stops the upload of the image file to the SP server 150 (i.e., the MFP 10 ends the processing of FIG. 3).

(Upload of Image File to SP Server 160)

Subsequently, the upload of the image file to the SP server 160 different from the SP server 150 is briefly described. Meanwhile, in this illustrative embodiment, in contrast to the SP server 150, the SP server 160 uses a general hierarchy relation of a folder and a file, not the hierarchy relation of a folder and an FG.

A user of the MFP 10 selects 'scan UL' and a service name (for example, 'Facebook') corresponding to the SP server 160. In this case, the control unit 30 of the MFP 10 executes respective processing in accordance with a flowchart different from FIG. 3. For example, in the respective processing, the control unit 30 provides a scan instruction to the scan execution unit 20 to thus generate N image files, like S6 of FIG. 3. Then, like S8 and S10 of FIG. 3, the control unit 30 acquires the URL of the UL server 100 from the API server 50. The SP server 160 stores a plurality of folders corresponding to the account information that has been already registered with the SP server 160 by the user. The control unit 30 transmits a first command for requesting transmission of a list of folder names of the folders to the API server 50.

When the first command is received from the MFP 10, the control unit 70 of the API server 50 acquires a list of folder names from the SP server 160 in accordance with an API (which is different from the API corresponding to the SP server 150) corresponding to the SP server 160. Then, the control unit 70 provides the list of folder names to the MFP 10.

When the list of folder names is acquired from the API server 50, the control unit 30 of the MFP 10 displays the list of folder names on the display 14. The user operates the operation unit 12 to thus select a folder name of a folder in which the image file should be stored from the list of folder names. In this case, the control unit 30 transmits a second command including the selected folder name to the API server 50.

When the second command is received from the MFP 10, the control unit 70 of the API server 50 provides the selected folder name included in the second command to the SP server 160 in accordance with the API corresponding to the SP server 160 and acquires from the SP server 160 a URL (i.e., a URL (hereinafter, referred to as 'target URL') indicating a position in the SP server 160) for uploading the image file to a folder having the selected folder name. Then, the control unit 70 provides the target URL to the MFP 10.

When the target URL is acquired from the API server 50, the control unit 30 of the MFP 10 transmits a third command for uploading the image file to the UL server 100. The third command includes the acquired URL of the UL server 100, as a request destination URL. Also, the third command includes the generated image file and the target URL.

When the third command is received from the MFP 10, the control unit 120 of the UL server 100 provides the image file and target URL included in the third command to the SP server 160 and uploads the image file.

As described above, in this illustrative embodiment, since the API server 50 has the respective APIs corresponding to the respective SP servers 150, 160, the API server 50 can perform a variety of communications with the respective SP servers 150, 160 in accordance with the respective APIs, in correspondence to the commands from the MFP 10. As a result, the MFP 10 can appropriately upload the image files to the respective SP servers 150, 160.

Figure 9:
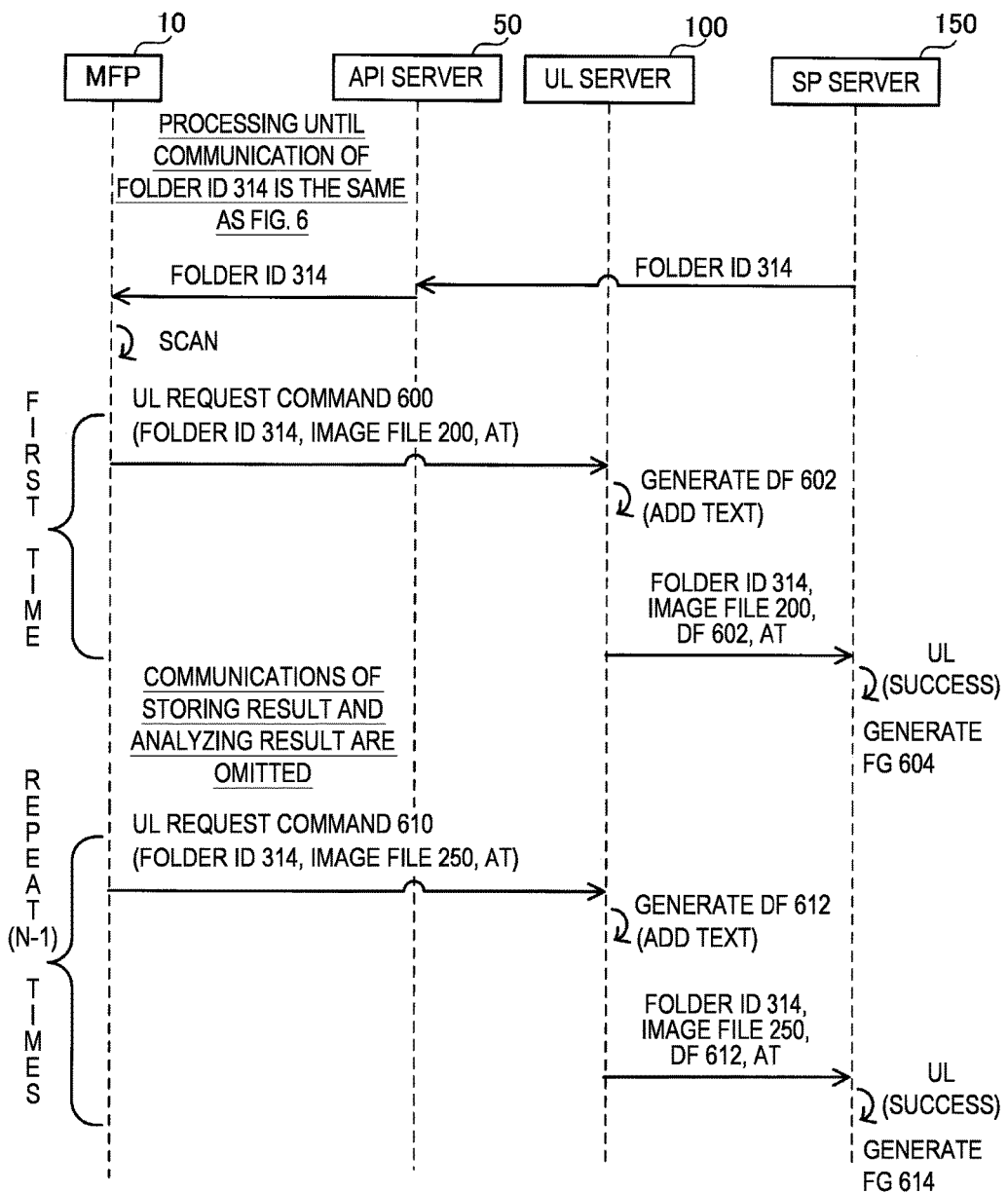
FIG. 9 is a sequence diagram of respective processing that is executed by respective devices of a comparative example.

Comparative Example: FIG. 9

A comparative example for uploading an image file to the SP server 150 is descried with reference to FIG. 9. The respective processing until the provision of the folder ID 314 from the SP server 150 to the API server 50 is the same as FIG. 6.

When the folder ID 314 is acquired from the API server 50, the MFP 10 generates N image files. Then, the MFP 10 transmits a UL request command 600 including the folder ID 314, image file 200 and AT to the UL server 100.

Figure 10B:
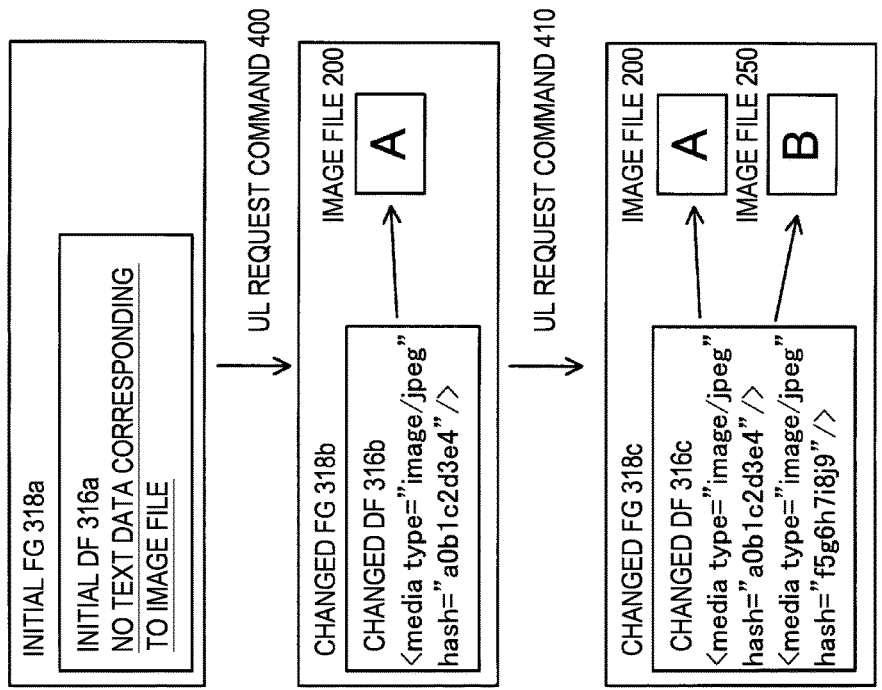

When the UL request command is received, the UL server 100 generates a DF 602. As shown in FIG. 10B, the DF 602 includes text data for specifying the image file 200. Then, the UL server 100 provides the folder ID 314, the image file 200, the DF 602 and the AT to the SP server 150 so as to generate a new FG in a target folder having the folder ID 314.

When the image file 200, the DF 602, the folder ID 314 and the AT are acquired, the SP server 150 specifies the account information to which the AT corresponds. Then, the SP server 150 specifies a target folder having the folder ID 314 from a plurality of folders corresponding to the specified account information. Then, the SP server 150 generates an FG 604 including the image file 200 and DF 602 in the specified target folder. Since the communications of the storing result and analyzing result are the same as FIG. 7, the descriptions thereof are omitted.

The MFP 10 also transmits a UL request command including the folder ID 314, image file 250 and AT to the UL server 100.

When the UL request command 610 is received, the UL server 100 generates a DF 612. As shown in FIG. 10B, the DF 612 is a DF different from the DF 602 and includes text data for specifying the image file 250. Then, the UL server 100 provides the folder ID 314, the image file 250, the DF 612 and the AT to the SP server 150 so as to generate a new FG in the target folder having the folder ID 314.

When the image file 250, the DF 612, the folder ID 314 and the AT are acquired, the SP server 150 specifies a target folder, based on the AT and the folder ID 314. Then, the SP server 150 generates an FG 614 including the image file 250 and DF 612 in the specified target folder. As shown in FIG. 10B, the FG 614 is an FG different from the FG 604. That is, according to this comparative example, whenever the UL request commands 600, 610 are received, the UL server 100 generates one FG including one image file in the target folder of the SP server 150. Therefore, when the N image files are generated by the MFP 10, the N FGs are generated in the target folder. As a result, when a user accesses the SP server 150 by using the PC and the like, for example, and then selects one FG name from a list of the FG names of the plurality of FGs in the target folder, the user can see only one image that is expressed by the one image file. That is, when the user wants to see the N images that are expressed by the N image files, the user should select each of the N FG names from the list of FG names. According to the comparative example, the user is forced to perform that cumbersome operation.

Effects of Illustrative Embodiment

According to this illustrative embodiment, as shown in FIG. 7, the UL server 100 receives the UL request command 410 instructing the upload of the image file 250 from the MFP 10 at a state where the current FG 318b including the current DF 316b and image file 200 is stored in the SP server 150. The UL request command 410 includes the FGID 320 of the current FG 318b. Therefore, the UL server 100 can use the FGID 320. As a result, the UL server 100 can upload the image file 250 to the SP server 150 so that the image file 250 is newly included in the current FG 318b. That is, the UL server 100 can acquire the current DF 316b from the SP server 150 and add the text data for specifying the image file 250 to the current DF 316b to thus generate the changed DF 316c. Then, the UL server 100 provides the changed DF 316c and the image file 250 to the SP server 150, thereby storing the changed FG 318c including the changed DF 316c and image files 200, 250 in the SP server 150, instead of the current FG 318b. That is, the UL server 100 can appropriately upload the plurality of image files 200, 250 to the same FG (i.e., the changed FG 318c).

Therefore, when the N image files are generated by the MFP 10 in accordance with the one instruction of 'scan UL' provided from the user, only one target FG including the N image files is generated in the target folder. As a result, when the user wants to confirm the N image that are expressed by the N image files, for example, the user can see all the N images if the user selects the FG name of the target FG from the list of the FG names of the FGs in the target folder. That is, the user can easily confirm the N images. According to this illustrative embodiment, the user convenience is improved, compared to the comparative example.

(Correspondence Relation)

The MFP 10 and the SP server 150 are examples of a communication apparatus and a data storage server, respectively. The combination of the API server 50 and the UL server 100 is an example of an intermediate server. The UL server 100 and the API server 50 are examples of a first server and a second server, respectively. The application program for the UL server 100 and the application program for the API server 50 are examples of a first application and a second application, respectively.

The DF 316a, the DF 316b and the DF 316c are examples of an initial document file, a current document file and a changed document file, respectively. The FG 318a, the FG 318b and the FG 318c are examples of an initial target file group, a current target file group and a changed target file group, respectively. The FGID 320 is an example of group identification information. The temporary FG name and the definitive FG name are examples of a first name and a second name, respectively.

The N image files are an example of a plurality of image files. The image file 200 and the text data for specifying the image file 200 are examples of one or more image files and one or more text data, respectively. The image file 250 and the text data for specifying the image file 250 are examples of first image file and first text data, respectively.

The HTTP program and the API corresponding to the SP server 150 are examples of a first program and a second program, respectively. The FG generation command 300 and the UL request command 410 are examples of a generation command and an upload command, respectively. The storing result 416 and the completion notification 420 are examples of result information and completion information, respectively. The URL 332 of the UL server 100 is an example of position information of the first server.

While the present invention has been shown and described with reference to certain illustrative embodiments thereof, it will be understood by those skilled in the art that various changes in form and details may be made therein without departing from the spirit and scope of the invention as defined by the appended claims.

Modified Embodiment 1

In the above illustrative embodiment, as shown in FIG. 7, the upload unit 132 of the UL server 100 (1) transmits the DF request command 412 including the FGID 320 to the SP server 150 to thus acquire the current DF 316b from the SP server 150, (2) adds the text data for specifying the image file 250 to the current DF 316b to thus generate the changed DF 316c and (3) provides the changed DF 316c and the image file 250 to the SP server 150. Instead of this operation, the upload unit 132 may provide the FGID 320 and the image file 250 to the SP server 150 without executing the acquisition and change of the current DF 316b and then the generation of the changed DF 316c. In this case, the SP server 150 may specify the current DF 316b based on the FGID 320 and add the text data for specifying the image file 250 to the current DF 316b, thereby generating the changed DF 316c. Also in this modified embodiment, the plurality of image files 200, 250 can be uploaded to the same FG. That is, the 'upload unit' may not have the file acquisition unit, the addition unit and the file provision unit.

Modified Embodiment 2

In the above illustrative embodiment, as shown in the case A of FIG. 8A, the name change unit 85 of the API server 50 generates the definitive FG name and provides the definitive FG name to the SP server 150, thereby changing the FG name of the target FG from the temporary FG name to the definitive FG name. Instead of this, the name change unit 85 may transmit the name change command for changing the FG name of the target FG to the SP server 150 without executing the generation and provision of the definitive FG name. In this case, the SP server 150 may generate a definitive FG name indicating current time and date to thus change the FG name of the target FG from the temporary FG name to the definitive FG name. That is, the name change unit 85 may transmit the name change command 424 including the definitive FG name to the SP server 150, like the above illustrative embodiment, or may transmit the name change command not including the definitive FG name to the SP server 150, like this modified embodiment. That is, the 'name change unit' may provide an instruction for name change to the data storage server.

Modified Embodiment 3

In the above illustrative embodiment, the temporary FG name is 'Uploading'. Instead of this, the temporary FG name may be another name enabling a user to recognize that the uploading is currently performed. For example, the temporary FG name may be 'Don't open' so that a user do not execute an operation of interrupting the upload. That is, the 'first name' may be an arbitrary name as long as it indicates that the uploading is currently performed.

Modified Embodiment 4

In the above illustrative embodiment, the definitive FG name indicates the time and date at which the upload of the image file is executed. Instead of this, the definitive FG name may be a name indicating a serial number such as '1', '2', '3' . . . or a name including a node name of the MFP 10. That is, the second name may be an arbitrary name as long as it is a name not indicating that the uploading is currently performed.

Modified Embodiment 5

The 'data storage server' may not be 'Evernote (registered trademark)' and may be a server of another type as long as it can store a file group including a document file and an image file. The 'document file' may not be a file of an XML format and may be a file of another format capable of describing text data for specifying an image file. Also, the 'text data' may not include a hash value that is obtained by hashing an image file and may be another data (for example, a file name of an image file) for specifying an image file.

Modified Embodiment 6

The 'first program' may not be the HTTP program and may be a program for performing communication in accordance with another communication protocol (for example, HTTPS). The 'second program' may not be the API corresponding to 'Evernote (registered trademark)' and may be an API corresponding to a server of another type.

Modified Embodiment 7

In the above illustrative embodiment, the API server 50 and the UL server 100 are separately provided but may be integrally configured. That is, the 'intermediate server' may have the first and second servers that are separately provided and may have the first and second servers that are integrally configured.

Modified Embodiment 8

In the above illustrative embodiment, the CPU 32 of the MFP 10 executes the processing according to the software, so that the functions of the respective units 41, 42 are implemented. Also, the CPUs 72, 122 of the API server 50 and the UL server 100 execute the processing according to the software, so that the functions of the respective units 81 to 86, 131 to 133, 141 to 143 are implemented. Instead of this, at least a part of the respective units 41, 42, 81 to 86, 131 to 133, 141 to 143 may be implemented by hardware such as a logical circuit and the like.

Also, the technical elements illustrated in the specification or drawings exhibit the technical availability individually or by a variety of combinations thereof and are not limited to the combinations defined in the claims at the time of filing the application. Also, the technique exemplified in the specification or drawings achieves a plurality of purposes at the same time and the achievement of any one purpose has the technical availability.

What is claimed is:

1. An intermediate server configured to intermediate between a communication apparatus and a data storage server in an upload of an image file from the communication apparatus to the data storage server, the intermediate server comprising:
one or more processors; and
memory storing computer-readable instructions therein, the computer-readable instructions, when executed by the one or more processors, causing the intermediate server to perform:
at a state where a current target file group including a current document file and one or more of a plurality of image files to be uploaded is stored in the data storage server, receiving from the communication apparatus an upload command for instructing an upload of a first image file of the plurality of image files to the data storage server, the current document file including one or more text data for respectively specifying the one or more image files stored in the data storage server, the upload command including group identification information for identifying the target file group and the first image file;

when the upload command is received:
    providing the group identification information to the data storage server to acquire the current document file from the data storage server;
    adding a first text for specifying the first image file to the current document file to generate a changed document file; and
    uploading, to the data storage server, the group identification information, the changed document file and the first image file to generate a changed target file group, wherein the changed target file group includes the changed document file, the one or more image files, and the first image file;
accessing the target file group using a single access request that includes the group identification information, wherein, in response to the single access request, the data storage server provides access to each of a plurality of image files in the target file group, including the one or more image files and the first image file.

2. The intermediate server according to claim 1, wherein the computer-readable instructions, when executed by the one or more processors, cause the intermediate server to further perform:
when result information indicating whether the current target file group is successfully changed is received from the data storage server, providing the result information to the communication apparatus.

3. The intermediate server according to claim 1,
wherein the receiving receives the upload command from the communication apparatus according to a first program, and
wherein the uploading changes the current target file group in the data storage server according to a second program different from the first program when the upload command is received.

4. The intermediate server according to claim 1,
wherein the computer-readable instructions, when executed by the one or more processors, cause the intermediate server to further perform:
    at a state where none of the plurality of image files is stored in the data storage server, receiving a generation command for instructing generation of an initial target file group from the communication apparatus;
    when the generation command is received, generating an initial document file which does not include any of a plurality of text data for specifying the plurality of image files;
    providing the initial document file to the data storage server to store the initial document file in the data storage server, the initial target file group including the initial document file and not including any of the plurality of image files; and
    when the group identification information is received from the data storage server after the initial document file is provided to the data storage server, providing the group identification information to the communication apparatus.

5. The intermediate server according to claim 4,
wherein the generating further generates a first name indicating that an upload is currently performed, as a name of the target file group, when generating the initial document file, and
wherein the providing of the initial document file further provides the first name to the data storage server when providing the initial document file to the data storage server, and
wherein the computer-readable instructions, when executed by the one or more processors, cause the intermediate server to further perform:
    when completion information indicating that all uploads of the plurality of image files are completed is received from the communication apparatus, providing the data storage server with an instruction for changing a name of the target file group from the first name to a second name which does not indicate that the upload is currently performed.

6. The intermediate server according to claim 4,
wherein the intermediate server includes:
    a first server including:
        a first processor, and
        memory storing a first application, when executed by the first processor, causing the first server to perform the receiving of the upload command, and the uploading of the first image file; and
    a second server including:
        a second processor; and
        memory storing a second application different from the first application, when executed by the second processor, causing the second server to perform the receiving of the generation command, the generating of the initial document file, the providing of the initial document file, and the providing of the group identification information.

7. The intermediate server according to claim 6,
wherein the second application, when executed by the second processor, causes the second server to further perform:
providing position information of the first server to the communication apparatus.

8. The intermediate server according to claim 1, wherein the changed document file comprises an XML file including the first text and the one or more text.

9. The intermediate server according to claim 8, wherein the first text includes a hash value obtained from the first image file and data indicating a type of the image file.

10. A communication apparatus configured to upload an image file to a data storage server via an intermediate server, the communication apparatus comprising:
one or more processor; and
memory storing computer-readable instructions therein, the computer-readable instructions, when executed by the one or more processors, causing the communication apparatus to perform:
    receiving a command for performing a document scanning function to scan a document including a plurality of sheets;
    generating a plurality of image files by scanning a series of images of the sheets;
    at a state where an initial target file group is stored in the data storage server, acquiring group identification information for identifying the initial target file group from the data storage server through the intermediate server, the initial target file group including an initial document file and not including any of the plurality of image files to be uploaded, the initial document file not including any of a plurality of text data for respectively specifying the plurality of image files; and at a state where a current target file group including a current document file and one or more image files of the plurality of image files is stored in the data storage server, transmitting to the intermediate server an upload command for instructing an upload of a first image file of the plurality of image files to the data storage server, the current document file being acquired by adding one or more text data for respectively specifying the one or more image files to the initial document file, the upload command including the group identification information and the first image file; and accessing the target file group using a single access request that includes the group identification information, wherein, in response to the single access request, the data storage server provides access to each of a plurality of image files in the target file group, including the one or more image files and the first image file.

11. A non-transitory computer-readable storage medium storing computer-readable instructions, when executed by a processor of an intermediate server configured to intermediate between a communication apparatus and a data storage server, causing the intermediate server to perform:

at a state where a current target file group including a current document file and one or more of a plurality of image files to be uploaded is stored in the data storage server, receiving from the communication apparatus an upload command for instructing an upload of a first image file of the plurality of image files to the data storage server, the current document file including one or more text for respectively specifying the one or more image files stored in the data storage server, the upload command including group identification information for identifying the target file group and the first image file; and when the upload command is received;
  providing the group identification information to the data storage server to acquire the current document file from the data storage server;
  adding a first text for specifying the first image file to the current document file to generate a changed document file; and
  uploading, to the data storage server, the group identification information, the changed document file and the first image file to generate a changed target file group, wherein the changed target file group includes the changed document file, the one or more image files, and the first image file; and accessing the target file group using a single access request that includes the group identification information, wherein, in response to the single access request, the data storage server provides access to each of a plurality of image files in the target file group, including the one or more image files and the first image file.

* * * * *